US009647520B2

(12) United States Patent
Tojima et al.

(10) Patent No.: US 9,647,520 B2
(45) Date of Patent: May 9, 2017

(54) DOUBLE STATOR SWITCHED RELUCTANCE ROTATING MACHINE

(71) Applicant: IHI Corporation, Tokyo (JP)

(72) Inventors: Narifumi Tojima, Tokyo (JP);
Takehiro Jikumaru, Tokyo (JP);
Norihisa Handa, Tokyo (JP);
Toshiyuki Hirao, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 14/746,578

(22) Filed: Jun. 22, 2015

(65) Prior Publication Data
US 2015/0288264 A1 Oct. 8, 2015

Related U.S. Application Data

(63) Continuation of application No. PCT/JP2013/084449, filed on Dec. 24, 2013.

(30) Foreign Application Priority Data

Jan. 10, 2013 (JP) .................................. 2013-002883
Apr. 1, 2013 (JP) .................................. 2013-075891

(51) Int. Cl.
H02P 1/46 (2006.01)
H02K 16/04 (2006.01)
H02P 25/08 (2016.01)
H02K 19/10 (2006.01)
H02K 1/24 (2006.01)
H02P 25/18 (2006.01)
(Continued)

(52) U.S. Cl.
CPC ............. *H02K 16/04* (2013.01); *H02K 1/246* (2013.01); *H02K 19/103* (2013.01); *H02P 25/08* (2013.01); *H02P 25/092* (2016.02); *H02P 25/18* (2013.01); *H02P 25/22* (2013.01)

(58) Field of Classification Search
CPC ......... H02P 25/08; H02P 25/18; H02K 16/00; H02K 15/02; H02K 19/12; H02K 1/185
See application file for complete search history.

(56) References Cited

U.S. PATENT DOCUMENTS 2,985,779 A 5/1961 Flaningam et al.
4,501,980 A 2/1985 Welburn
5,039,897 A 8/1991 Iwamatsu et al.
(Continued)

FOREIGN PATENT DOCUMENTS

CN 202488301 U 10/2012
DE 38 21 660 C1 8/1989
(Continued)

OTHER PUBLICATIONS

International Search Report mailed Mar. 25, 2014 in PCT/JP2013/084449 (with an English translation) (4 pages).
(Continued)

Primary Examiner — Karen Masih
(74) Attorney, Agent, or Firm — Rothwell, Figg, Ernst & Manbeck, P.C.

(57) ABSTRACT

A double stator switched reluctance rotating machine includes an annular rotor, an outer stator that is disposed outside the rotor, and an inner stator that is disposed inside the rotor, and has a structure in which the outer and inner stators are connected to each other in parallel.

10 Claims, 26 Drawing Sheets

(51) Int. Cl.
*H02P 25/22* (2006.01)
*H02P 25/092* (2016.01)

(56) References Cited

U.S. PATENT DOCUMENTS

| | | | |
|---|---|---|---|
| 5,744,895 | A | 4/1998 | Seguchi et al. |
| 5,783,893 | A | 7/1998 | Dade et al. |
| 5,838,085 | A | 11/1998 | Roesel, Jr. et al. |
| 6,603,232 | B2 | 8/2003 | Van Dine et al. |
| 8,860,281 | B2 | 10/2014 | Maekawa et al. |
| 8,928,198 | B2 | 1/2015 | Lutz et al. |
| 2003/0015931 | A1 | 1/2003 | Nishimura |
| 2004/0130229 | A1 | 7/2004 | Akatsu et al. |
| 2005/0077802 | A1 | 4/2005 | Toujima et al. |
| 2005/0151437 | A1 | 7/2005 | Ramu |
| 2007/0252486 | A1* | 11/2007 | Kobayashi ............ H02K 5/24 310/261.1 |
| 2008/0142284 | A1 | 6/2008 | Qu et al. |
| 2008/0174194 | A1 | 7/2008 | Qu et al. |
| 2008/0246429 | A1 | 10/2008 | Atarashi et al. |
| 2009/0021089 | A1 | 1/2009 | Nashiki |
| 2013/0187505 | A1 | 7/2013 | Sendo |
| 2015/0288235 | A1 | 10/2015 | Tojima et al. |

FOREIGN PATENT DOCUMENTS

| | | | |
|---|---|---|---|
| JP | 9-8183 | Y1 | 6/1934 |
| JP | 2-228234 | A | 9/1990 |
| JP | 6-121518 | A | 4/1994 |
| JP | 2004-201488 | A | 7/2004 |
| JP | 2008-131663 | A | 6/2008 |
| JP | 2008-161000 | A | 7/2008 |
| JP | 2008-259302 | A | 10/2008 |
| JP | 2008-301610 | A | 12/2008 |
| JP | 2010-98853 | A | 4/2010 |
| JP | 2011-244643 | A | 12/2011 |
| JP | 2012-44864 | A | 3/2012 |
| WO | 2012/045121 | A1 | 4/2012 |

OTHER PUBLICATIONS

International Search Report mailed Mar. 25, 2014 in PCT/JP2013/084867 (with English translation) (4 pages).

U.S. Office Action mailed Jul. 5, 2016 in co-pending U.S. Appl. No. 14/743,843, filed Jun. 18, 2015. (21 pages).

* cited by examiner (a)

(b)

DOUBLE STATOR SWITCHED RELUCTANCE ROTATING MACHINE

This application is a Continuation of International Application No. PCT/JP2013/084449, filed on Dec. 24, 2013, claiming priority based on Japanese Patent Application No. 2013-002883, filed on Jan. 10, 2013, and Japanese Patent Application No. 2013-075891, filed on Apr. 1, 2013 the content of which are incorporated herein by reference in their entirety.

TECHNICAL FIELD

The present invention relates to a double stator switched reluctance rotating machine.

BACKGROUND ART

A switched reluctance rotating machine does not include a permanent magnet or a winding wire in a rotor and is adapted to be operated by magnetic attraction generated between the rotor and a stator. The switched reluctance rotating machine has problems of vibration, noise, and the like in principle. However, the switched reluctance rotating machine has a simple and solid structure, can also withstand high-speed rotation, and is inexpensive since the switched reluctance rotating machine does not require expensive permanent magnets such as neodymium magnets. Accordingly, in recent years, research and development for the switched reluctance rotating machine as a rotating machine, which is inexpensive and excellent in reliability, has progressed for a practical use.

As part of the progress to the practical use, a method of making the switched reluctance rotating machine have a double-stator structure is proposed in order to improve the performance of the switched reluctance rotating machine.

Patent Document 1 discloses a double-stator motor that includes an annular rotor, an inner stator disposed inside the rotor, and an outer stator disposed outside the rotor.

Coils, which have phases corresponding to each other, of the inner and outer stators are connected to each other in series. According to this structure, since it is possible to align currents flowing in the coils, which correspond to the respective phases, of both the inner and outer stators, it is possible to make magnetomotive forces of both the inner and outer stators equal. Accordingly, since magnetic flux, which is generated by the inner and outer stators and interlinked with each other, is reduced, it is possible to increase reluctance torque.

RELATED ART DOCUMENTS

Patent Documents

[Patent Document 1] Japanese Unexamined Patent Application, First Publication No. 2011-244643

DISCLOSURE OF THE INVENTION

Problems to be Solved by the Invention

Since the salient pole structure of the rotor of a switched reluctance rotating machine is not required in the related art, it is relatively easy to ensure a winding space in the inner stator and it is possible to make magnetomotive forces (the number of windings of the wire×current) equal. However, since the salient pole structure of the rotor needs to be made large in the switched reluctance rotating machine in order to improve performance (to increase torque, and the like), it is difficult to sufficiently ensure a winding space in the inner stator.

A method of reducing the cross-sectional area of a winding wire to increase the number of windings of the wire or a method of increasing the length (depth) of a salient pole of the inner stator to ensure a winding space is considered to make the magnetomotive forces equal in the switched reluctance rotating machine. However, since current density is increased in the former method, there are possibilities in that the efficiency of a motor decreases and the temperature of the winding wire rises due to an increase of a copper loss. Further, since the diameter of the shaft supporting the weight of the entire rotating machine is traded off in the latter method, there is a possibility in that mechanical strength cannot be sufficiently ensured for an increase in weight when the diameter of the shaft is reduced.

The invention is made in consideration of the above-mentioned circumstances, and an object of the invention is to provide a double stator switched reluctance rotating machine of which performance can be improved.

Solution to Problem

In order to solve the above-mentioned circumstances, according to a first aspect of the invention, there is provided a double stator switched reluctance rotating machine including an annular rotor, an outer stator that is disposed outside the rotor, and an inner stator that is disposed inside the rotor. The outer and inner stators are connected to each other in parallel.

According to this structure, in the first aspect, when the outer and the inner stators are connected to each other in series, current is reduced due to an increase of inductance and the magnetomotive force of the outer stator to be mainly driven is significantly reduced. However, when the outer and inner stators are connected to each other in parallel, the magnetomotive force of the outer stator can be ensured and an output of the inner stator can be taken out. Accordingly, since the output is a simple sum of the outputs of the outer and inner stators, the performance of the motor is easily improved.

Further, according to a second aspect of the invention, in the first aspect, a magnetomotive force of the inner stator is smaller than a magnetomotive force of the outer stator.

Furthermore, according to a third aspect of the invention, in the first or second aspect, the number of phases of the outer stator is the same as the number of phases of the inner stator, and coils, which have phases corresponding to each other, are connected to each other in parallel.

Moreover, according to a fourth aspect of the invention, the double stator switched reluctance rotating machine according to any one of the first to third aspects further includes conduction modes that include some or all of a first mode in which a current flows in only the inner stator, a second mode in which a current flows in only the outer stator, and a third mode in which a current flows in both the outer and inner stators, and a switch that switches the conduction modes.

Further, according to a fifth aspect of the invention, the double stator switched reluctance rotating machine according to the fourth aspect further includes: a current measuring member configured to measure currents flowing in winding wires, which have phases corresponding to each other, of the outer and inner stators; and a current control member configured to perform current control corresponding to each of the conduction modes on the basis of measurement results of the current measuring member.

Furthermore, according to a sixth aspect of the invention, the double stator switched reluctance rotating machine according to the fifth aspect further includes an inverter that includes a parallel circuit connecting the winding wires, which have phases corresponding to each other, of the outer and inner stators in parallel. The current measuring member includes a first ammeter that measures a current flowing in the winding wire of the outer stator in the parallel circuit, and a second ammeter that measures a current flowing in the winding wire of the inner stator in the parallel circuit.

Moreover, according to a seventh aspect of the invention, the double stator switched reluctance rotating machine according to the fifth aspect further includes an inverter that includes a parallel circuit connecting the winding wires, which have phases corresponding to each other, of the outer and inner stators in parallel. The current measuring member includes a first ammeter that measures a current flowing in the winding wire of the outer stator in the parallel circuit, and a second ammeter that measures an input current or an output current of the parallel circuit. The current control member obtains a current, which flows in the winding wire of the inner stator, from a difference between measurement results of the first and second ammeters.

Further, according to an eighth aspect of the invention, the double stator switched reluctance rotating machine according to the fifth aspect further includes an inverter that includes a parallel circuit connecting the winding wires, which have phases corresponding to each other, of the outer and inner stators in parallel. The current measuring member includes a first ammeter that measures a current flowing in the winding wire of the inner stator in the parallel circuit, and a second ammeter that measures an input current or an output current of the parallel circuit. The current control member obtains a current, which flows in the winding wire of the outer stator, from a difference between measurement results of the first and second ammeters.

Furthermore, according to a ninth aspect of the invention, the double stator switched reluctance rotating machine according to the fourth aspect further includes a power converter. The power converter includes a parallel circuit that connects the winding wires, which have phases corresponding to each other, of the outer and inner stators in parallel, and switching elements that are provided on input and output sides of the winding wires and are driven so as to convert power. The power converter includes the switching elements of the input or output side on the winding wires of the outer and inner stators as the switches, respectively.

Moreover, according to a tenth aspect of the invention, the double stator switched reluctance rotating machine according to any one of the fourth to ninth aspects further includes a control device that switches the conduction mode according to a rotational load of the rotor.

Further, according to an eleventh aspect of the invention, in any one of the first to tenth aspects, a yoke portion of the rotor has a thickness corresponding to magnetic characteristics of the outer and inner stators.

Advantageous Effects of Invention

According to the invention, a double stator switched reluctance rotating machine of which performance can be improved is obtained.

DESCRIPTION OF EMBODIMENTS

An example of an embodiment of the invention will be described below with reference to the drawings.

(First Embodiment)

Figure 1:
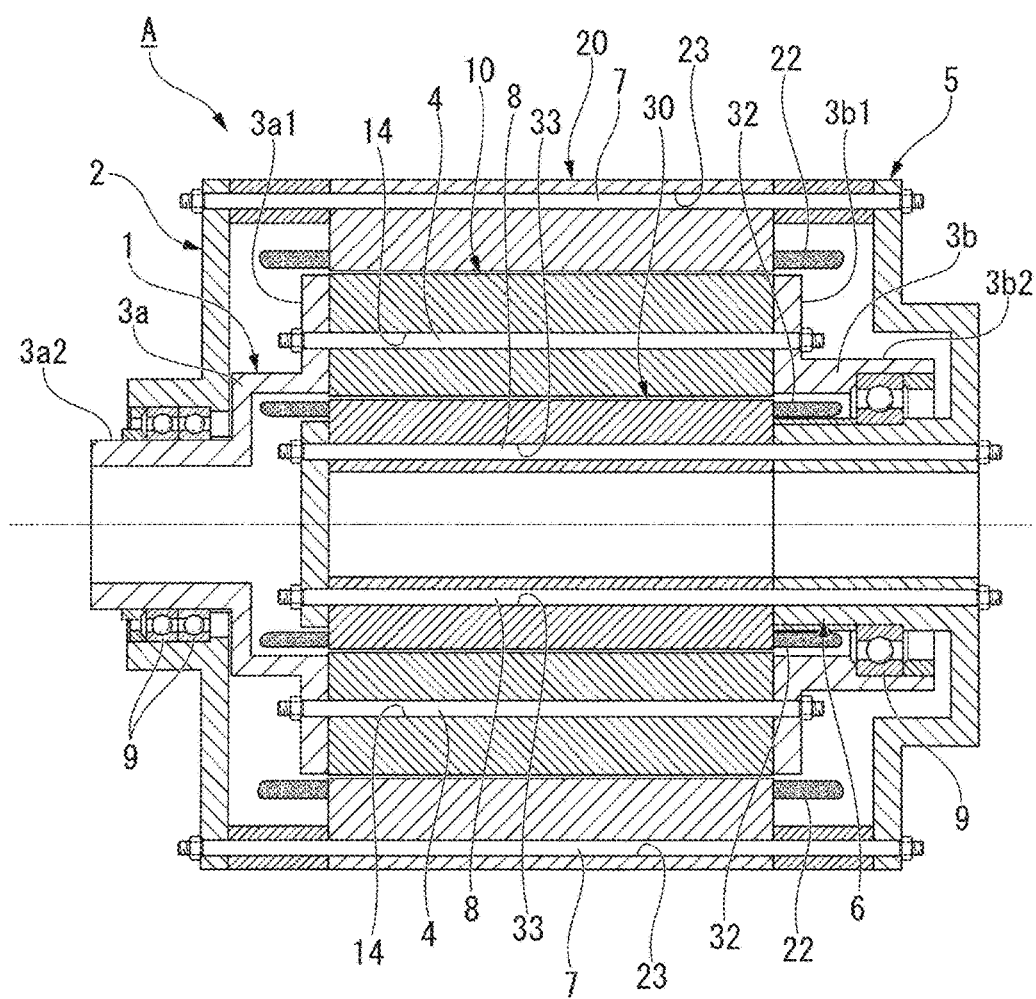
FIG. 1 is a cross-sectional view of a double stator switched reluctance motor according to a first embodiment of the invention.
Figure 2:
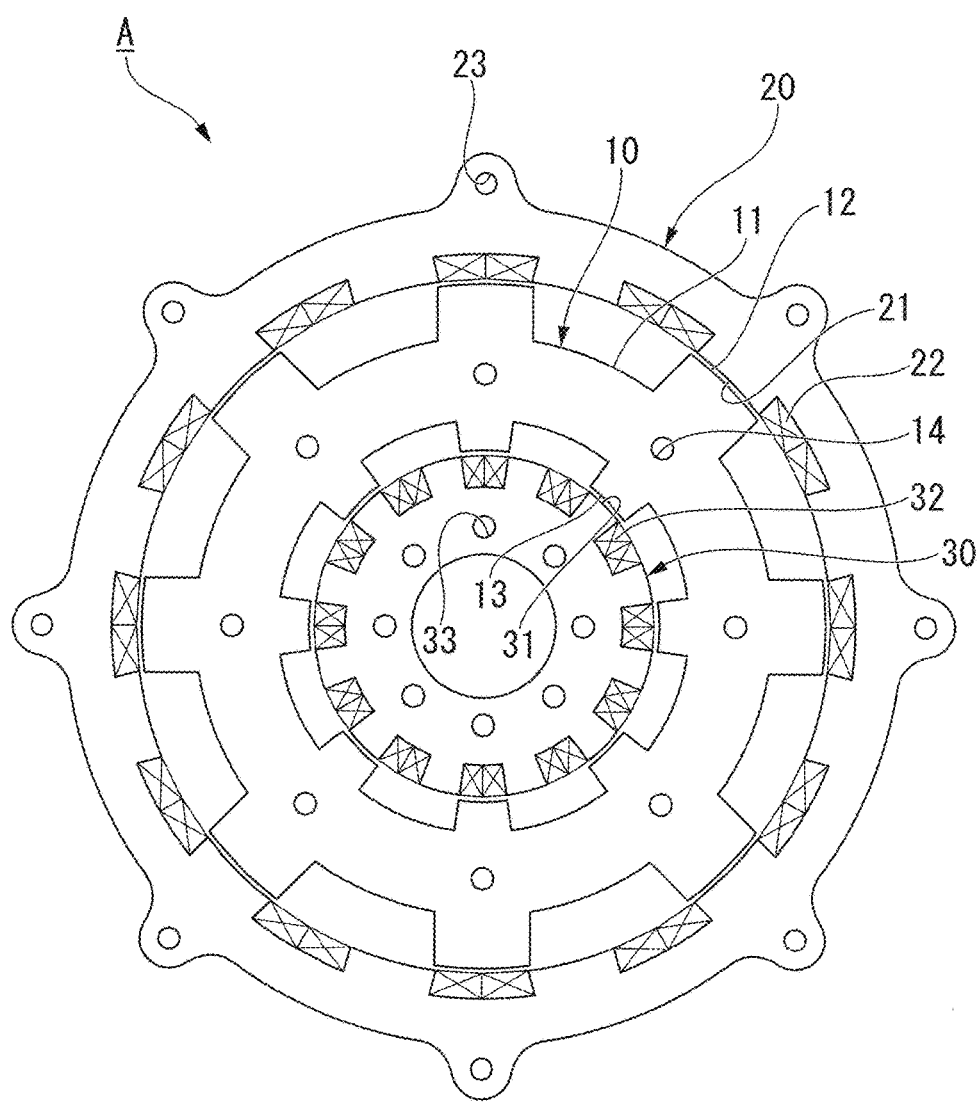
FIG. 2 is a cross-sectional view of FIG. 1.
Figure 3:
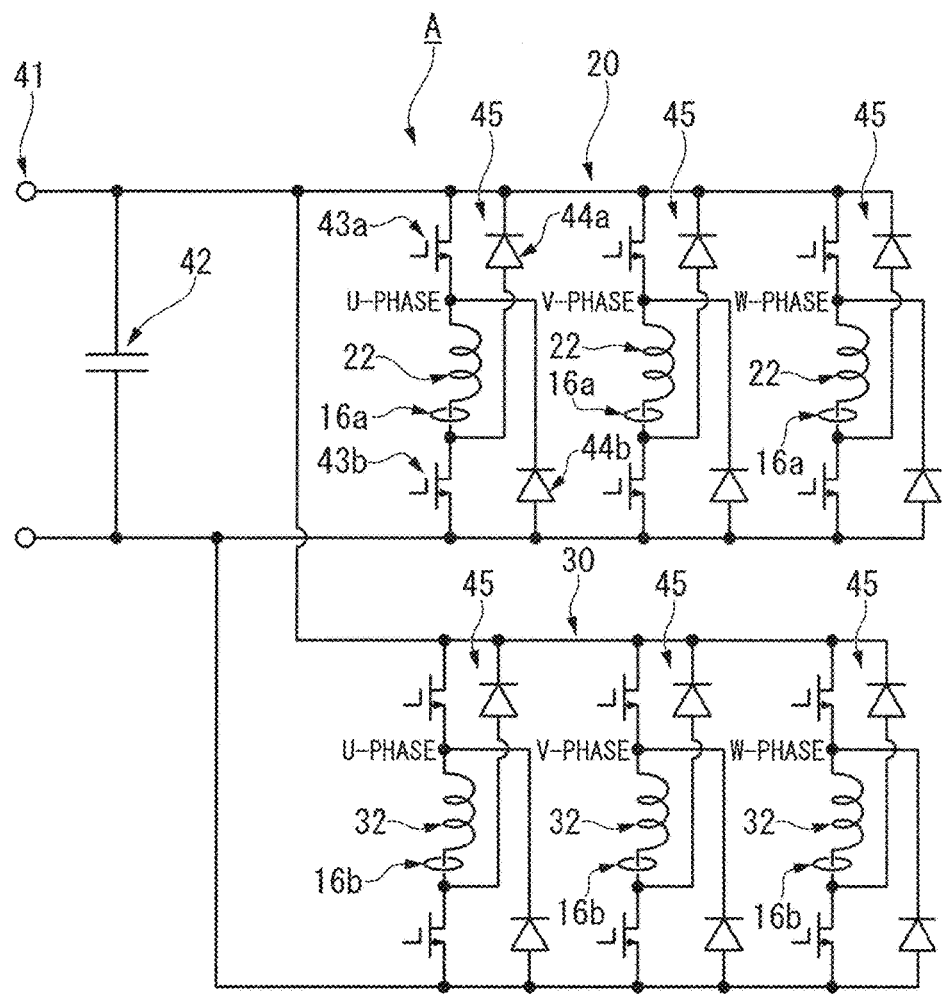
FIG. 3 is a circuit diagram of the double stator switched reluctance motor according to the first embodiment of the invention.
Figure 4:
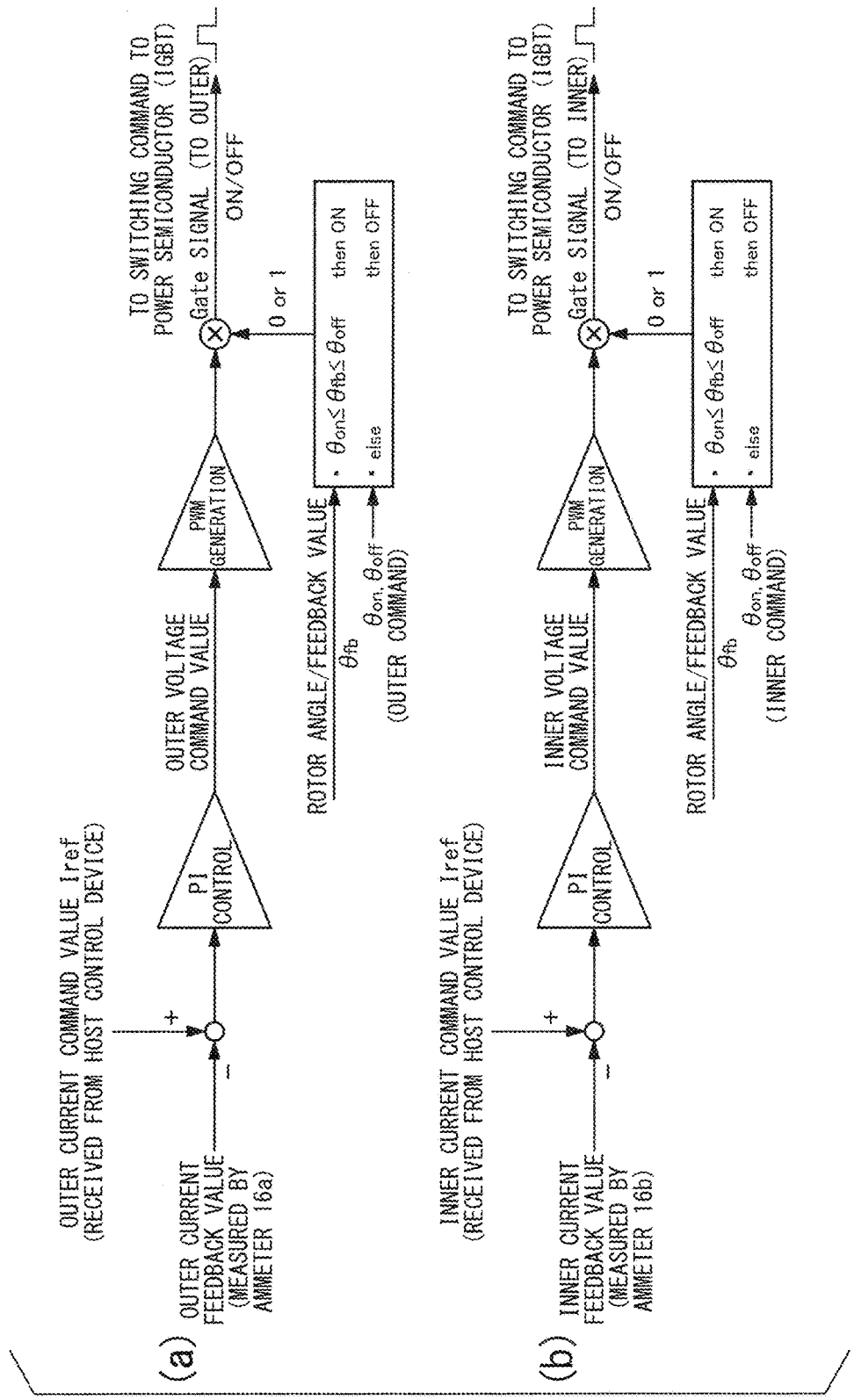
FIG. 4 is a view showing the control logics of the double stator switched reluctance motor according to the first embodiment of the invention.

FIG. 1 is a cross-sectional view of a double stator switched reluctance motor A according to a first embodiment of the invention. FIG. 2 is a cross-sectional view of FIG. 1. FIG. 3 is a circuit diagram of the double stator switched reluctance motor A according to the first embodiment of the invention. FIG. 4 is a view showing the control logics of the double stator switched reluctance motor A according to the first embodiment of the invention.

As shown in FIG. 2, the double stator switched reluctance motor A (hereinafter, simply referred to as a switched reluctance motor A in some cases) includes an annular rotor 10, an outer stator 20 that is disposed outside the rotor 10, and an inner stator 30 that is disposed inside the rotor 10. The switched reluctance motor A according to this embodiment is a three-phase motor having a U-phase, a V-phase, and a W-phase, and has a three-phase 12/8-pole structure in which the number of poles of the stator is 12 and the number of poles of the rotor is 8.

As shown in FIG. 1, the switched reluctance motor A includes a rotor base 1 and a stator base 2. The rotor base 1 is connected to the rotor 10 and can rotate integrally with the rotor 10. The rotor base 1 includes a base member 3a that is connected to one side (the left side in FIG. 1) of the rotor 10 in an axial direction and a base member 3b that is connected to the other side (the right side in FIG. 1) of the rotor 10 in the axial direction. The base members 3a and 3b are fastened and fixed to the rotor 10 by a plurality of bolts 4.

The bolts 4 are inserted into bolt fastening holes 14 that are formed in the rotor 10 so as to pass through the rotor 10 in the axial direction (the horizontal direction in FIG. 1), and fasten the rotor 10 together with the base members 3a and 3b from both sides in the axial direction. The base member 3a includes a flange portion 3a1 to which the rotor 10 is connected and a cylindrical shaft portion 3a2 that protrudes from the stator base 2 and is connected to an output shaft (not shown). The base member 3b includes a flange portion 3b1 to which the rotor 10 is connected and a cylindrical shaft portion 3b2 that is rotatably supported in the stator base 2.

The stator base 2 includes an outer housing 5 that supports the outer stator 20 and an inner housing 6 that supports the inner stator 30. The rotor base 1 is disposed between the outer housing 5 and the inner housing 6 in the shape of a bush. The outer stator 20 is fastened and fixed to the outer housing 5 by a plurality of bolts 7. The bolts 7 are inserted into bolt fastening holes 23 that are formed in the outer stator 20 so as to pass through the outer stator 20 in the axial direction, and fasten the outer stator 20 together with the outer housing 5 from both sides in the axial direction.

The inner stator 30 is fastened and fixed to the inner housing 6 by a plurality of bolts 8. The bolts 8 are inserted into bolt fastening holes 33 that are formed in the inner stator 30 so as to pass through the inner stator 30 in the axial direction, and fasten the inner stator 30 together with the inner housing 6 from both sides in the axial direction. Further, the stator base 2 houses a plurality of bearings 9 that support the rotor base 1 so as to allow the rotor base 1 to be rotatable. The bearings 9 are provided on both sides of the rotor 10 so that one bearing 9 is provided between the outer periphery of the inner housing 6 and the inner periphery of the shaft portion 3b2 and two bearings 9 are provided between the inner periphery of the outer housing 5 and the outer periphery of the shaft portion 3a2.

The rotor 10 is formed so that a plurality of electromagnetic steel sheets are fastened and fixed while being laminated in the axial direction. As shown in FIG. 2, the rotor 10 includes an annular yoke portion 11, first salient poles 12 that protrude outward from the yoke portion 11, and second salient poles 13 that protrude inward from the yoke portion 11 and have the same phase as the first salient poles 12. The yoke portion 11 is formed in a cylindrical shape and has a thickness that is magnetically sufficient. Eight first salient poles 12 are provided on the outer periphery of the yoke portion 11 at intervals of 45°. Further, eight second salient poles 13 are provided on the inner periphery of the yoke portion 11 at intervals of 45° so as to have the same phase as the first salient poles 12.

The outer stator 20 is funned of an annular magnetic body, and includes 12 salient poles 21 that are provided on the inner periphery of the outer stator 20 at intervals of 30° and coils 22 that are wound on the salient poles 21, respectively. The coils 22 are arranged so that phases are separated in the order of a U-phase, a V-phase, a W-phase, a U-phase, and the like in a circumferential direction.

The inner stator 30 is formed of an annular magnetic body, and includes 12 salient poles 31 that are provided on the outer periphery of the inner stator 30 at intervals of 30° so as to have the same phase as the salient poles 21 and coils 32 that are wound on the salient poles 31, respectively. Just like the coils 22, the coils 32 are arranged so that phases are separated in the order of a U-phase, a V-phase, a W-phase, a U-phase, and the like in the circumferential direction.

The switched reluctance motor A having the above-mentioned structure includes inverter circuits shown in FIG. 3. In FIG. 3, reference numeral 41 denotes a DC power source and reference numeral 42 denotes a smoothing capacitor. Further, the outer stator 20 is provided with four coils 22 per phase, but only one coil 22 per phase will be shown to represent the coils 22 for the improvement of visual recognition and the rest of the coils 22 will not be shown. Furthermore, likewise, the inner stator 30 is also provided with four coils 32 per phase, but only one coil 32 per phase will be shown to represent the coils 32 for the improvement of visual recognition and the rest of the coils 32 will not be shown.

As shown in FIG. 3, the outer and inner stators 20 and 30 are connected to each other in parallel. In this embodiment, the inverter circuit of the outer stator 20 and the inverter circuit of the inner stator 30 are connected to each other in parallel. As described above, specifically, the outer and inner stators 20 and 30 are electrically connected to each other in parallel. Each of the inverter circuits includes an asymmetric half bridge circuit 45 that includes two switching elements 43a and 43b and two diodes 44a and 44b. The asymmetric half bridge circuits 45 are connected to the coils 22 of the outer stator 20 and the coils 32 of the inner stator 30, respectively. The coils 22 and 32 can be individually driven (conducted) by the asymmetric half bridge circuits 45.

Further, in this embodiment, the switched reluctance motor A includes a plurality of ammeters 16a that control currents flowing in the coils 22 of the outer stator 20 and a plurality of ammeters 16b that measure currents flowing in the coils 32 of the inner stator 30. The ammeters 16a and 16b measure the currents flowing in the coils 22 and 32 and are adapted to independently control the currents of the outer and inner stators 20 and 30.

(a) of FIG. 4 shows the control logic of the current control of the outer stator 20, and (b) of FIG. 4 shows the control logic of the current control of the inner stator 30.

PI control is performed in the current control of the outer stator 20 so that a deviation between the value (outer current feedback value) of a current, which flows in the coil 22, measured by the ammeter 16a and an outer current command value Iref (target value) received from a host control device (not shown) is eliminated. Accordingly, an outer voltage command value is obtained. This outer voltage command value is converted into pulse width modulation (PWM), and a gate signal generated so as to correspond to the command value is sent to the switching elements 43a and 43b (see FIG. 3) formed of power semiconductors.

The gate signal is generated so that "1" is output and a pulse is turned "ON" when a rotor angle θfb (feedback value) measured by an encoder (not shown) or the like is present between outer command values θon and θoff and "0" is output and a pulse is turned "OFF" in other cases. The outer command values θon and θoff are set on the basis of table data of the rotating speed and the torque of the rotor 10, which are stored in advance, together with the outer current command value Iref. The table data are stored in a control device (not shown) in advance by experiments, analysis, and the like, and the outer current command value Iref and the outer command values θon and θoff are determined from the rotating speed and the torque of the rotor 10.

PI control is performed in the current control of the inner stator 30 so that a deviation between the value (inner current feedback value) of a current, which flows in the coil 32, measured by the ammeter 16b and an inner current command value Iref (target value) received from a host control device (not shown) is eliminated. Accordingly, an inner voltage command value is obtained. This inner voltage command value is converted into PWM, and a gate signal generated so as to correspond to the command value is sent to the switching elements 43a and 43b formed of power semiconductors.

Further, the gate signal is generated so that "1" is output and a pulse is turned "ON" when a rotor angle θfb (feedback value) measured by an encoder (not shown) or the like is present between inner command values θon and θoff and "0" is output and a pulse is turned "OFF" in other cases. The inner current command value Iref and the inner command values θon and θoff are set on the basis of table data that are stored in advance by the above-mentioned method. However, since the table data are individually stored on the outer stator 20 and the inner stator 30, the currents of the outer and inner stators 20 and 30 are controlled independently of each other.

Furthermore, as shown in FIG. 3, in this embodiment, the outer and inner stators 20 and 30 are connected to each other in parallel, magnetomotive forces of the outer and inner stators 20 and 30 are different from each other, and the magnetomotive force of the inner stator 30 is set to be smaller than the magnetomotive force of the outer stator 20. A magnetomotive force is obtained by the product of the number of windings of a coil and a current that flows in the coil. It is difficult to structurally ensure enough winding space in the inner stator 30 in the double stator structure as shown in FIG. 2.

A method of reducing the cross-sectional area of a winding wire to increase the number of windings of the wire or a method of increasing the length (depth) of the salient pole 31 of the inner stator 30 to ensure a winding space is considered to make the magnetomotive force equal in the switched reluctance motor A. However, since current density is increased in the former method, there are problems in that the efficiency of a motor decreases and the temperature of the winding wire rises due to an increase of a copper loss. Further, since the diameter of the shaft supporting the weight of the entire motor is traded off in the latter method, there is a possibility in that mechanical strength cannot be sufficiently ensured for an increase in weight when the diameter of the shaft is reduced.

Accordingly, since the magnetomotive force of the inner stator 30 is set to be smaller than the magnetomotive force of the outer stator 20 in this embodiment, a decrease in the efficiency of the motor and the rise of the temperature of the winding wire are prevented and mechanical strength is sufficiently ensured. Furthermore, it is not necessary to reduce the cross-sectional area of the winding wire to increase the number of windings of the wire or to increase the length (depth) of the salient pole of the inner stator to ensure a winding space. Since magnetic flux flowing out of one of the outer and inner stators 20 and 30 flows backward to the other thereof when the magnetomotive forces of the outer and inner stators 20 and 30 are different from each other, there is a concern that the performance of the motor may deteriorate. However, it is confirmed from an electromagnetic analysis test that an adverse effect is not generated when the thickness of the yoke portion 11 of the rotor 10 in a direction perpendicular to a rotor shaft is sufficiently ensured on the basis of magnetic characteristics of the outer and inner stators 20 and 30 as in this embodiment.

Figure 5A:
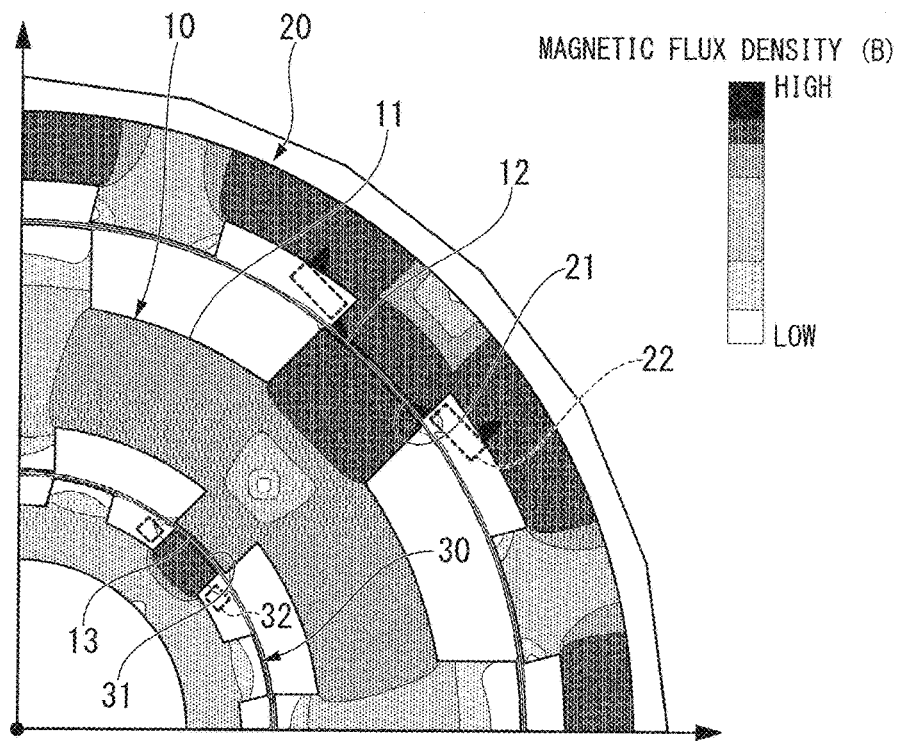
FIG. 5A is a view showing static magnetic field-analysis results when the thickness of a rotor of the first embodiment of the invention is sufficiently ensured.
Figure 5B:
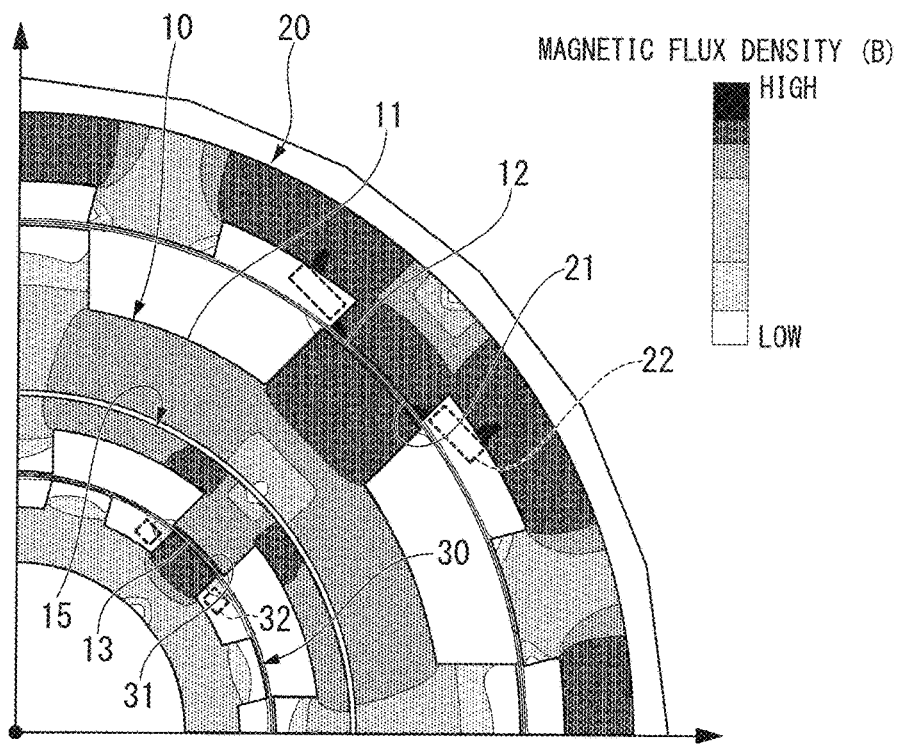
FIG. 5B is a view showing static magnetic field-analysis results when a flux barrier is inserted into the rotor as a comparative example.

FIG. 5A is a view showing static magnetic field-analysis results when the thickness of the rotor 10 of the first embodiment of the invention is sufficiently ensured. FIG. 5B is a view showing static magnetic field-analysis results when a flux barrier 15 is inserted into the rotor 10 as a comparative example. The intensity of a magnetic field (B) is shown in FIGS. 5A and 5B by the color density of a dot pattern. It is understood that magnetic flux is appropriately concentrated on the first and second salient poles 12 and 13 and magnetic flux density becomes high when the thickness of the rotor 10 shown in FIG. 5A is sufficiently ensured. On the other hand, it is understood that magnetic flux does not easily flow and torque is reduced since magnetic flux density becomes extremely high at a portion except for the first and second salient poles 12 and 13 (at a portion near the root of the second salient pole 13) when the flux barrier 15 (clearance) is inserted into the rotor 10 shown in FIG. 5B as the comparative example. It is understood that a method of sufficiently ensuring the thickness of the yoke portion 11 of the rotor 10 is more effective than a method of magnetically dividing the rotor 10 into a portion close to the outer stator 20 and a portion close to the inner stator 30 by inserting the flux barrier 15 into the rotor 10.

Further, when the outer and inner stators 20 and 30 are connected to each other in parallel as shown in FIG. 3, an effect of improving the performance of the motor is enhanced in comparison with a case in which the outer and inner stators 20 and 30 are connected to each other in series. That is, the reason for this is that the magnetomotive force of the outer stator 20 to be mainly driven is significantly reduced due to the reduction of current since inductance is increased in the series connection. On the other hand, since the magnetomotive force of the outer stator 20 can be ensured and an output of the inner stator 30 can be taken out in the parallel connection, the output is a simple sum of the outputs of the outer and inner stators 20 and 30. Accordingly, the performance of the motor is easily improved.

Figure 6A:
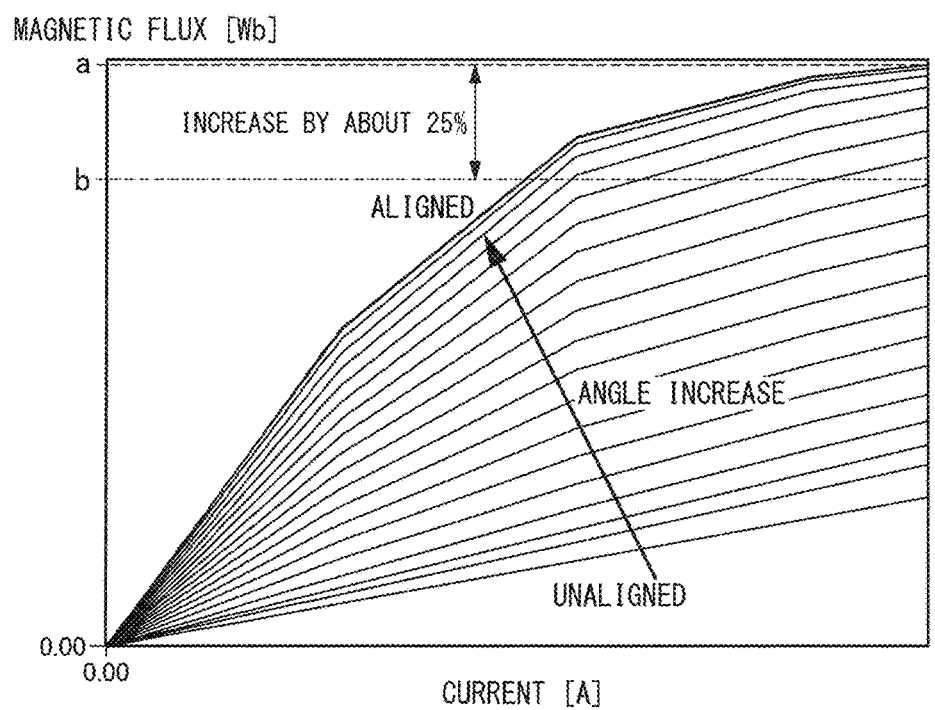
FIG. 6A is a graph showing a relationship between the magnetic flux and the current of the double stator switched reluctance motor according to the first embodiment of the invention.
Figure 6B:
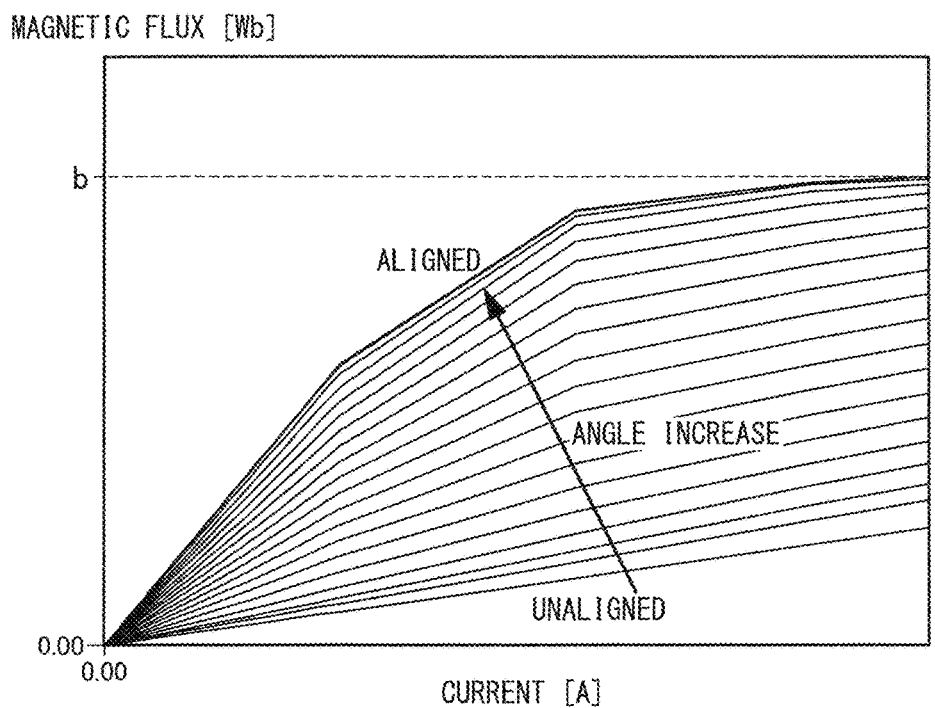
FIG. 6B is a graph showing a relationship between the magnetic flux and the current of a (single stator) switched reluctance motor in the related art as a comparative example.
Figure 7A:
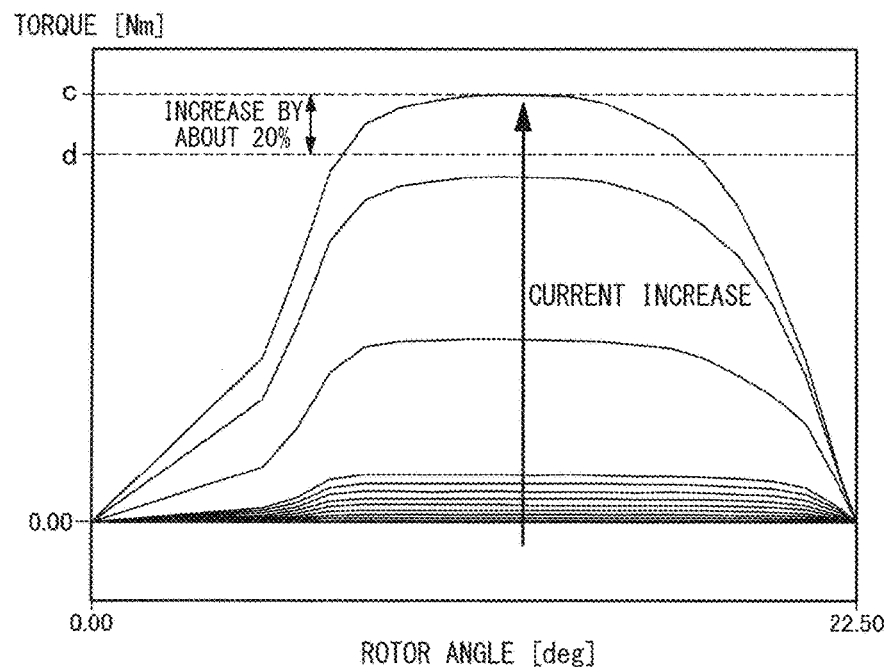
FIG. 7A is a graph showing a relationship between the torque and the rotor angle of the double stator switched reluctance motor according to the first embodiment of the invention.
Figure 7B:
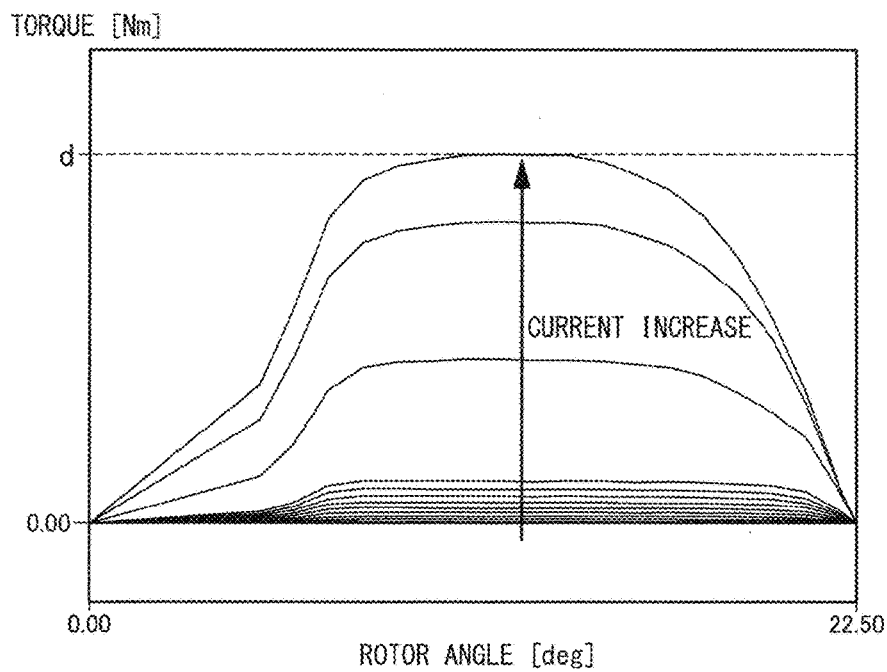
FIG. 7B is a graph showing a relationship between the torque and the rotor angle of the (single stator) switched reluctance motor in the related art as the comparative example.

FIG. 6A is a graph showing a relationship between magnetic flux and current of the double stator switched reluctance motor A according to the first embodiment of the invention. FIG. 6B is a graph showing a relationship between the magnetic flux and the current of a (single stator) switched reluctance motor in the related art as the comparative example. FIG. 7A is a graph showing a relationship between the torque and the rotor angle of the double stator switched reluctance motor A according to the first embodiment of the invention. FIG. 7B is a graph showing a relationship between the torque and the rotor angle of the (single stator) switched reluctance motor in the related art as the comparative example.

FIGS. 6A and 7A show the results of the double stator switched reluctance motor A, and FIGS. 6B and 7B show the results of the switched reluctance motor (including only an outer stator) in the related art. Furthermore, "ALIGNED" and "UNALIGNED" in FIGS. 6A and 6B mean a positional relationship in which the stator is aligned with the salient poles of the rotor and a positional relationship in which the stator is analigned with the salient poles of the rotor.

It is understood that the maximum value a of the magnetic flux of the double stator switched reluctance motor A is increased by about 25% in comparison with the maximum value b of the magnetic flux of the switched reluctance motor in the related art as shown in FIGS. 6A and 6B. Further, it is understood that the maximum value c of the torque of the double stator switched reluctance motor A is increased by about 20% in comparison with the maximum value d of the torque of the switched reluctance motor in the related art as shown in FIGS. 7A and 7B. It is understood that the performance of the motor is improved since not only the output of the outer stator 20 but also the output of the inner stator 30 can be taken out in the parallel connection as described above.

Table 1 shows performance comparison between the parallel connection and series connection of the double stator switched reluctance motor A according to the first embodiment of the invention. Table 2 shows performance comparison when the magnetomotive force of the inner stator 30 of the double stator switched reluctance motor A according to the first embodiment of the invention is changed. The switched reluctance motor (including only an outer stator) in the related art is used as the comparative example in Tables 1 and 2.

TABLE 1

|  | Input condition | | Output result | | |
|---|---|---|---|---|---|
|  | Firing angle [deg] | Extinction angle [deg] | Output [p.u] | Magnetomotive force [A] Outer | Inner |
| SRM (Related art) | −3 | 15 | 0.862 | 8424 | — |
|  | −1.5 | 15 | 0.864 | 7964 | — |
|  | 0 | 15 | 0.788 | 7024 | — |
| Double stator SRM (Series connection) | −4.5 | 15 | 0.894 | 8300 | 4150 |
|  | −3 | 15 | 0.897 | 7844 | 3922 |
|  | −1.5 | 15 | 0.773 | 6688 | 3344 |
|  | 0 | 15 | 0.557 | 5228 | 2614 |
| Double stator SRM (Parallel connection) | −3 | 15 | 0.961 | 8432 | 3510 |
|  | −1.5 | 15 | 0.963 | 7968 | 3380 |

TABLE 2

|  | Input condition | | Output result | | |
|---|---|---|---|---|---|
|  | Firing angle [deg] | Extinction angle [deg] | Output [p.u.] | Magneto- motive force [A] Outer | Inner |
| SRM | −1.5 | 15 | 0.864 | 7964 | — |
| Double stator SRM (Parallel connection) | | | | | |
| Fixed number of windings of wire of outer stator/ first number of windings of wire of inner stator | −1.5 | 15 | 1.156 | 7964 | 6725 |
| Fixed number of windings of wire of outer stator/ second number of windings of wire of inner stator | −1.5 | 15 | 1.111 | 7964 | 5636 |
| Fixed number of windings of wire of outer stator/ third number of windings of wire of inner stator | −1.5 | 15 | 0.963 | 7968 | 3380 |

It is understood that an output of the parallel connection is increased in comparison with that of the series connection as shown in Table 1 when the parallel connection and the series connection are compared with each other. Specifically, it is understood that current does not flow in due to an increase of inductance and an output is reduced in comparison with the related art when a firing angle is −1.5° and an extinction angle is 15° in the series connection. It is understood that output characteristics are improved and an output is increased by about 4% in comparison with an output in the related art when the firing angle is advanced (−3°). On the other hand, it is understood that output characteristics are further improved due to an increase of a current and an output is increased by about 12% in comparison with the related art and is increased by about 7% in comparison with the series connection when a firing angle is −1.5° and an extinction angle is 15° in the parallel connection.

Further, it is understood that an output is increased in all cases in comparison with the related art as shown in Table 2 when the number of windings of the wire of the outer stator 20 is fixed and the number of windings of the wire of the inner stator 30 is increased (the first number of windings of the wire<the second number of windings of the wire<the third number of windings of the wire) to change a magnetomotive force. It is understood that an output is increased when the magnetomotive force of the inner stator 30 is increased. However, since the above-mentioned other factors (a copper loss, the rise of the temperature of the winding wire, the diameter of the shaft, and the like) are traded off, it is realistic to set the magnetomotive force of the inner stator 30 to be smaller than the magnetomotive force of the outer stator 20.

As described above, according to this embodiment described above, the double stator switched reluctance motor A includes the annular rotor 10, the outer stator 20 that is disposed outside the rotor 10, and the inner stator 30 that is disposed inside the rotor 10; and employs a structure in which the outer and inner stators 20 and 30 are connected to each other in parallel. Accordingly, it is possible to improve the performance of the motor, to prevent a decrease in the efficiency of the motor and the rise of the temperature of the winding wire, and to sufficiently ensure mechanical strength.

For this reason, according to this embodiment, it is possible to improve the performance of the switched reluctance motor A that is inexpensive and excellent in reliability.

(Second Embodiment)

Next, a second embodiment of the invention will be described. In the following description, the same components as the components of the above-mentioned embodiment or components equivalent to the components of the above-mentioned embodiment will be denoted by the same reference numerals and the description thereof will be simplified or omitted.

Figure 8:
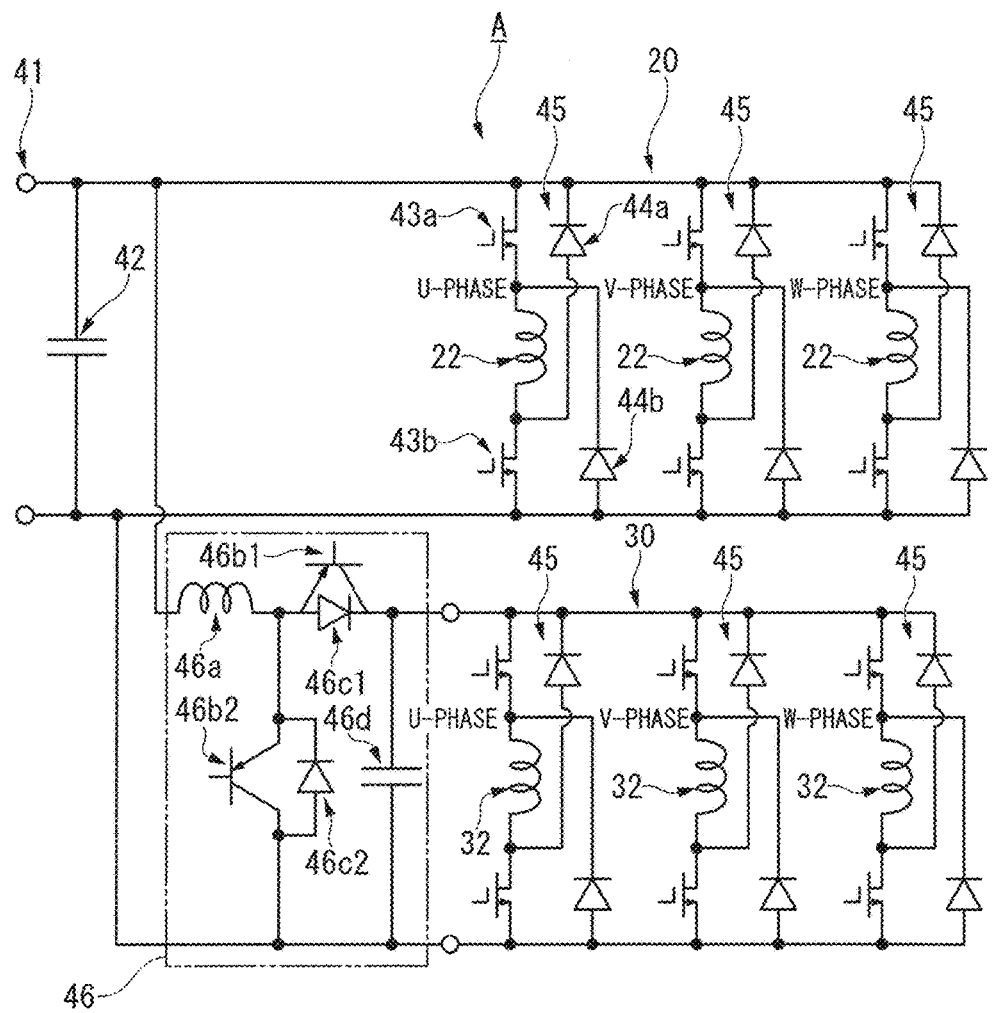
FIG. 8 is a circuit diagram of a double stator switched reluctance motor according to a second embodiment of the invention.
Figure 9:
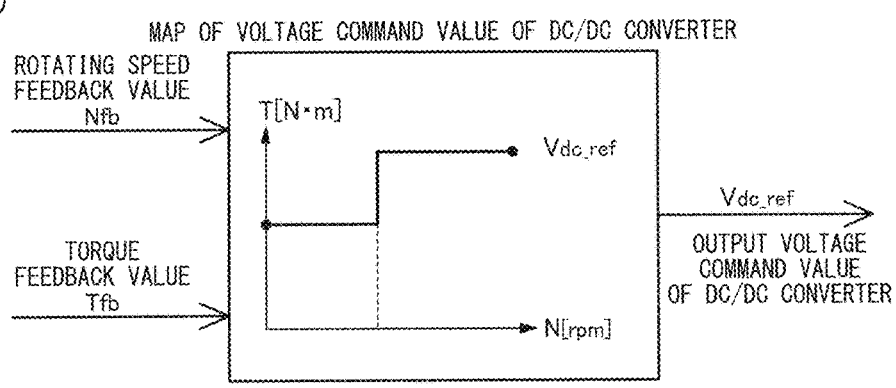
FIG. 9 is a view showing the control logics of the double stator switched reluctance motor according to the second embodiment of the invention.
Figure 9:
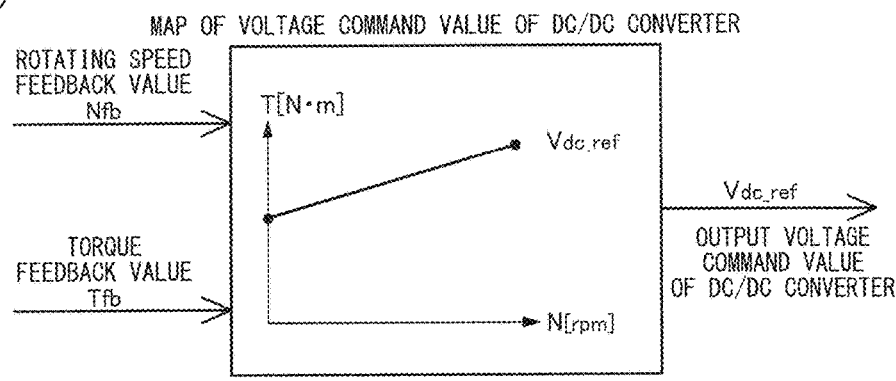

FIG. 8 is a circuit diagram of a double stator switched reluctance motor A according to a second embodiment of the invention. FIG. 9 is a view showing the control logics of the double stator switched reluctance motor A according to the second embodiment of the invention.

The second embodiment is different from the above-mentioned embodiment in that a parallel circuit of an inner stator 30 is provided with a DC/DC converter 46 as shown in FIG. 8.

The DC/DC converter 46 shown in FIG. 8 is a booster circuit that includes a reactor 46a, transistors 46b1 and 46b2, diodes 46c1 and 46c2, and a capacitor 46d.

(a) of FIG. 9 shows the control logic of the voltage control of the DC/DC converter 46. In the voltage control of the DC/DC converter 46, a map, of which a vertical axis represents torque T and a horizontal axis represents rotating speed N, of a voltage command value of the DC/DC converter 46 is stored in advance and an output voltage command value Vdc_ref of the DC/DC converter 46 is output from a rotating speed feedback value Nth and a torque feedback value Tfb of the rotor 10. In the map of the voltage command value of the DC/DC converter, the output voltage command value Vdc_ref of the DC/DC converter is increased stepwise.

According to the second embodiment, a DC voltage applied to the inner stator 30 can be adjusted by the DC/DC converter 46. Accordingly, the magnetomotive force or the like of the inner stator 30 can be easily adjusted without, for example, the work for changing the number of windings of the wire or the like. Further, it is possible to improve the efficiency of the motor by increasing the output voltage command value Vdc_ref of the DC/DC converter 46 as the rotating speed and the torque of the rotor 10 are increased, as shown in (a) of FIG. 9. For example, since the motor can be driven by a low voltage corresponding to the output thereof when the rotating speed and the torque of the rotor 10 are low, the efficiency of the motor is improved. On the other hand, since the motor can be driven by a high voltage corresponding to the output thereof when the rotating speed and the torque of the rotor 10 are high, the efficiency of the motor is improved. Furthermore, since a large amount of current is made to flow by a high voltage, torque (output) can be improved.

In the map of the voltage command value of the DC/DC converter 46, the output voltage command value Vdc_ref of the DC/DC converter 46 may be increased in a linear function manner as shown in (b) of FIG. 9. Further, the DC/DC converter 46 may be provided on the outer stator 20 without being provided on the inner stator 30, and may be provided on each of both the outer and inner stators 20 and 30. Furthermore, a case in which the DC/DC converter 46 is a booster circuit is shown in FIG. 8, but the DC/DC converter 46 may be a step-down circuit.

(Third Embodiment)

Next, a third embodiment of the invention will be described. In the following description, the same components as the components of the above-mentioned embodiments or components equivalent to the components of the above-mentioned embodiments will be denoted by the same reference numerals and the description thereof will be simplified or omitted.

Figure 10:
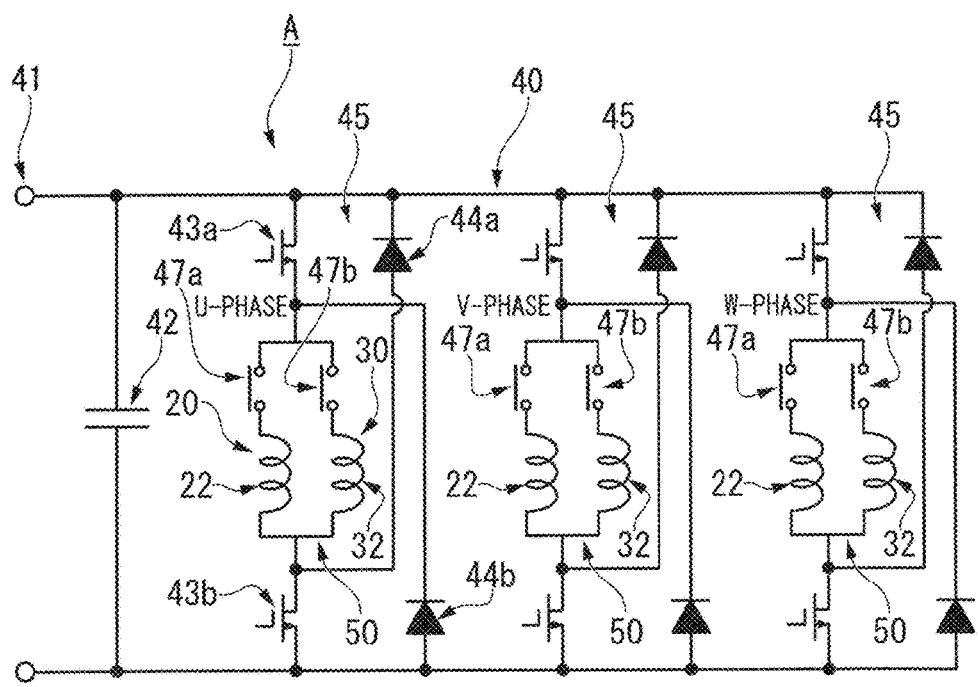
FIG. 10 is a view showing a circuit of a double stator switched reluctance motor according to a third embodiment of the invention.

FIG. 10 is a circuit diagram of a double stator switched reluctance motor A according to a third embodiment of the invention.

The third embodiment is different from the above-mentioned embodiments in that coils 22 and 32, which have phases corresponding to each other, of outer and inner stators 20 and 30 are connected to each other in parallel and the coils 22 and 32 are provided with switches 47a and 47b, respectively, as shown in FIG. 10.

In the switched reluctance motor A according to the third embodiment, the outer and inner stators 20 and 30 are connected to each other in parallel and are operated by one inverter 40. The inverter 40 includes parallel circuits 50 that connect the coils 22 and 32, which have phases corresponding to each other, of outer and inner stators 20 and 30 in parallel. The parallel circuit 50 is included in an asymmetric half bridge circuit 45 that includes two switching elements 43a and 43b and two diodes 44a and 44b.

The parallel circuit 50 is provided with switches 47a and 47b (switch member). The switches 47a and 47b switch a conduction mode to a first mode in which a current flows in only the inner stator 30, a second mode in which a current flows in only the outer stator 20, and a third mode in which a current flows in both the outer and inner stators 20 and 30. Specifically, in the first mode, the switch 47a is turned "OFF" and the switch 47b is turned "ON". In the second mode, the switch 47a is turned "ON" and the switch 47b is turned "OFF". In the third mode, the switch 47a is turned "ON" and the switch 47b is turned "ON".

In the third embodiment, efficiency is improved by the switching of the conduction mode of one or both of the outer and inner stators 20 and 30 that are connected to each other in parallel and have different magnetomotive forces. That is, the reason for this is as follows: when the inner stator 30 corresponding to a low output is operated alone in the case of a low output, efficiency is good. Further, when the outer stator 20 corresponding to a medium output is operated alone in the case of a medium output, efficiency is good. Furthermore, when the outer and inner stators 20 and 30 are operated together in order to correspond to a high output in the case of a high output, efficiency is good.

Figure 11:
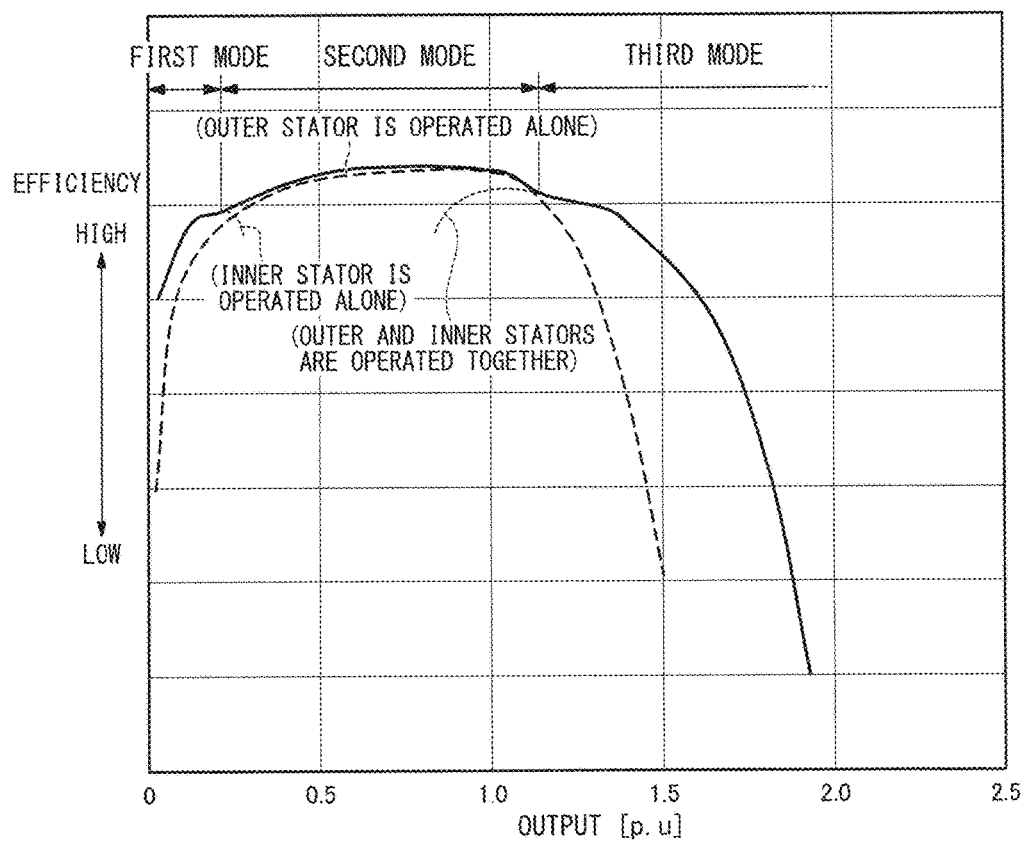
FIG. 11 is a graph showing a relationship between the efficiency and an output that are obtained by the switching of a conduction mode of the third embodiment of the invention.

FIG. 11 is a graph showing a relationship between the efficiency and an output that are obtained by the switching of a conduction mode of the third embodiment of the invention.

As shown in FIG. 11, it is understood that efficiency is good when the inner stator 30 is operated alone in the case of a low output. Further, it is understood that efficiency is good when the outer stator 20 is operated alone in the case of a medium output. Furthermore, it is understood that efficiency is good when the outer and inner stators 20 and 30 are operated together in the case of a high output.

Accordingly, according to the third embodiment, it is possible to achieve a high-efficiency operation (which is shown in FIG. 11 by a solid line) over a high output from a low output by switching a conduction mode to the first mode in the case of a low output, switching a conduction mode to the second mode in the case of a medium output, and switching a conduction mode to the third mode in the case of a high output.

Figure 12:
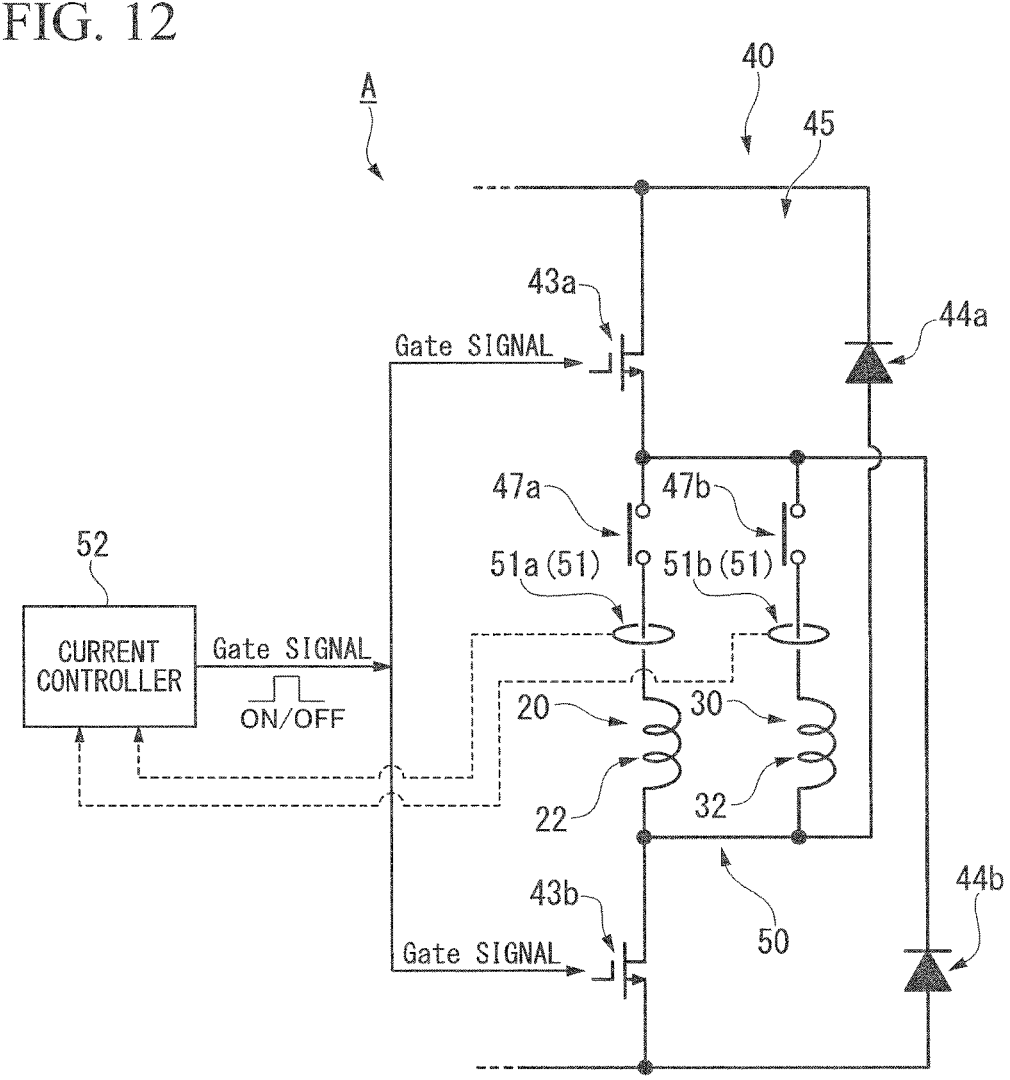
FIG. 12 is a view showing main parts of a circuit of the double stator switched reluctance motor according to the third embodiment of the invention.

The switched reluctance motor A has a structure shown in FIG. 12 in order to allow the current control according to the switching of the conduction mode.

FIG. 12 is a view showing main parts of a circuit of the double stator switched reluctance motor A according to the embodiment of the invention.

In FIG. 12, only the asymmetric half bridge circuit 45 corresponding to one phase among three phases is shown to represent the asymmetric half bridge circuits for the improvement of visual recognition and the asymmetric half bridge circuits 45 corresponding to the other phases are not shown. However, the asymmetric half bridge circuits 45 corresponding to the other phases also have the same structure as described above.

As shown in FIG. 12, the switched reluctance motor A includes current measuring units 51 (current measuring member) that measure currents flowing in the respective coils 22 and 32, which have phases corresponding to each other, of outer and inner stators 20 and 30, and a current controller 52 (current control member) that performs current control corresponding to the respective conduction modes on the basis of measurement results of the current measuring units 51.

The current measuring unit 51 includes an ammeter 51a (first ammeter) that measures a current flowing in the coil 22 of the outer stator 20 in the parallel circuit 50, and an ammeter 51b (second ammeter) that measures a current flowing in the coil 32 of the inner stator 30 in the parallel circuit 50.

Measurement results of ammeters 51a and 51b are input to the current controller 52.

The current controller 52 outputs gate signals to the switching elements 43a and 43b of the inverter 40, converts DC currents into AC currents corresponding to three phases, that is, a U-phase, a V-phase, and a W-phase by the switching operations of the switching elements 43a and 43b, and supplies the AC currents to the coils 22 and 32 corresponding to the phases. The current controller 52 performs control shown in FIG. 13 in the conduction modes.

Figure 13:
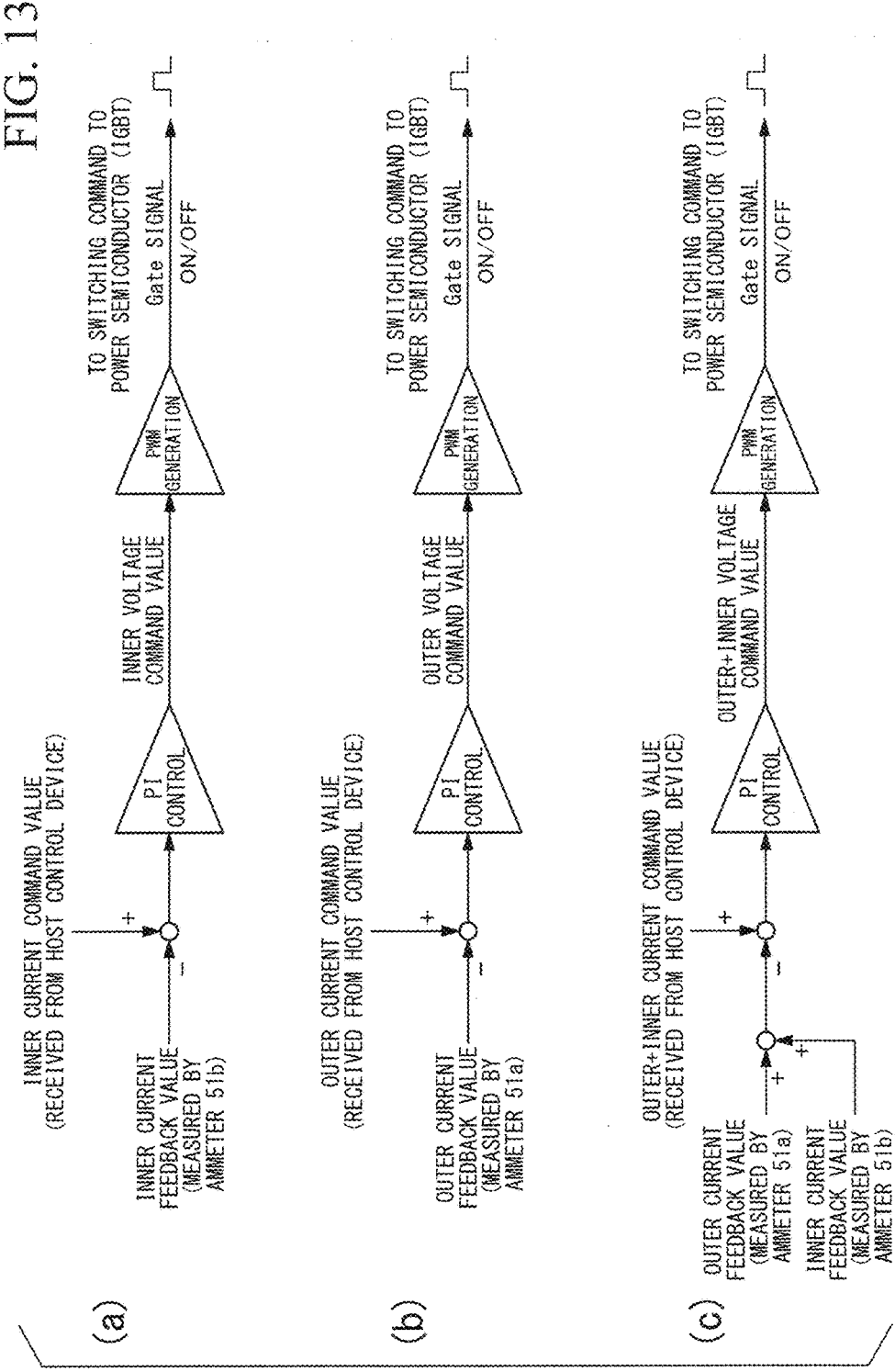
FIG. 13 is a view showing the control logics of a current controller of the third embodiment of the invention in each conduction modes.

FIG. 13 is a view showing the control logics of the current controller 52 of the embodiment of the invention in the respective conduction modes.

(a) of FIG. 13 shows current control in the case of the first mode (the inner stator 30 is operated alone). (b) of FIG. 13 shows current control in the case of the second mode (the outer stator 20 is operated alone). (c) of FIG. 13 shows current control in the case of the third mode (the outer and inner stators 20 and 30 are operated together). The control logics of the respective conduction modes are illustrative, and the configuration thereof may be appropriately changed according to specifications.

PI control is performed in the case of the first mode of (a) of FIG. 13 so that a deviation between the value (inner current feedback value) of a current, which flows in the coil 32, measured by the ammeter 51b and an inner current command value (target value) received from a host control device (not shown) is eliminated. Accordingly, an inner voltage command value (analog value) is obtained. This inner voltage command value is converted into PWM, and a gate signal generated so as to correspond to the command value is sent to the switching elements 43a and 43b.

PI control is performed in the case of the second mode of (b) of FIG. 13 so that a deviation between the value (outer current feedback value) of a current, which flows in the coil 22, measured by the ammeter 51a and an outer current command value (target value) received from the host control device (not shown) is eliminated. Accordingly, an outer voltage command value (analog value) is obtained. This outer voltage command value is converted into PWM, and a gate signal generated so as to correspond to the command value is sent to the switching elements 43a and 43b.

PI control is performed in the case of the third mode of (c) of FIG. 13 so that a deviation between the sum of the value of a current measured by the ammeter 51a and the value of a current measured by the ammeter 51b and an outer+inner current command value (target value) received from the host control device (not shown) is eliminated. Accordingly, an outer+inner voltage command value (analog value) is obtained. This outer+inner voltage command value is converted into PWM, and a gate signal generated so as to correspond to the command value is sent to the switching elements 43a and 43b.

According to this embodiment, since currents flowing in the coils 22 and 32, which have phases corresponding to each other, of outer and inner stators 20 and 30 are measured, current control corresponding to each conduction mode can be performed even though the conduction mode of one or both of the outer and inner stators 20 and 30 is switched. Accordingly, while currents do not exceed the allowable currents of the coils 22 and 32 or the switching elements 43a and 43b in this embodiment, the switched reluctance motor A can be operated. Further, since the outer and inner stators 20 and 30 share one inverter 40 and the current measuring unit 51 is formed of the two ammeters 51a and 51b provided in the parallel circuit 50 so that the number of installed sensors necessary for the current control becomes minimum, it is possible to reduce costs.

Accordingly, according to this embodiment described above, the double stator switched reluctance motor A includes the annular rotor 10, the outer stator 20 that is disposed outside the rotor 10, and the inner stator 30 that is disposed inside the rotor 10; and employs a structure in which the outer and inner stators 20 and 30 are connected to each other in parallel. The double stator switched reluctance motor A further includes: the switches 47a and 47b that switch a conduction mode to a first mode in which a current flows in only the inner stator 30, a second mode in which a current flows in only the outer stator 20, and a third mode in which a current flows in both the outer and inner stators 20 and 30; the current measuring units 51 that measure currents flowing in the coils 22 and 32, which have phases corresponding to each other, of outer and inner stators 20 and 30; and the current controller 52 that performs current control corresponding to the respective conduction modes on the basis of measurement results of the current measuring units 51. Therefore, it is possible to improve the performance of the switched reluctance motor A that is inexpensive and excellent in reliability. Since, the winding wires, which have phases corresponding to each other, of the stators 20 and 30 are connected to each other in parallel, it is possible to easily make the outer and inner stators 20 and 30 operate in association with each other.

Furthermore, structures shown in FIGS. 14 to 17 can also be employed in the third embodiment.

In the following description, the same components as the components of the above-mentioned embodiments or components equivalent to the components of the above-mentioned embodiments will be denoted by the same reference numerals and the description thereof will be simplified or omitted.

Figure 14:
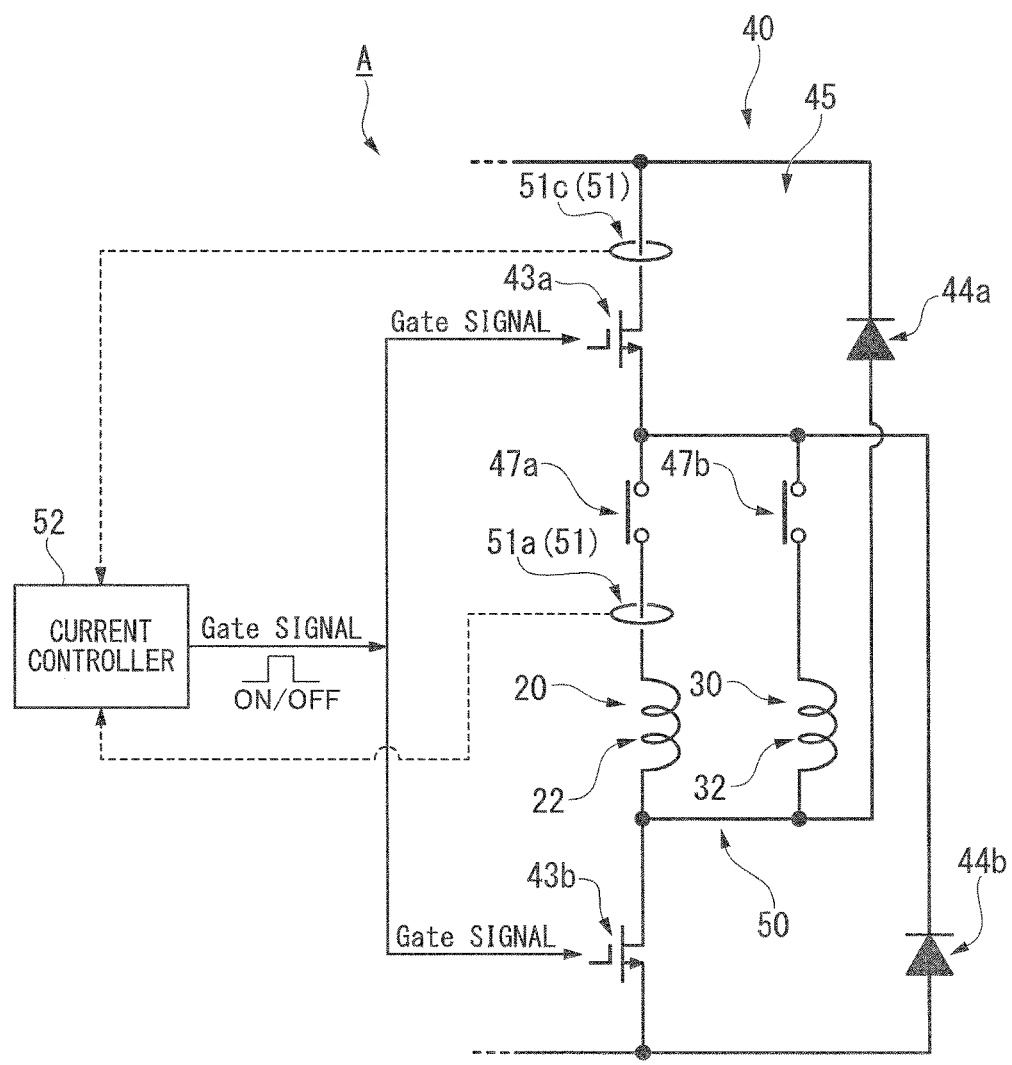
FIG. 14 is a view showing main parts of a circuit of a double stator switched reluctance motor according to a modification example of the third embodiment of the invention.
Figure 15:
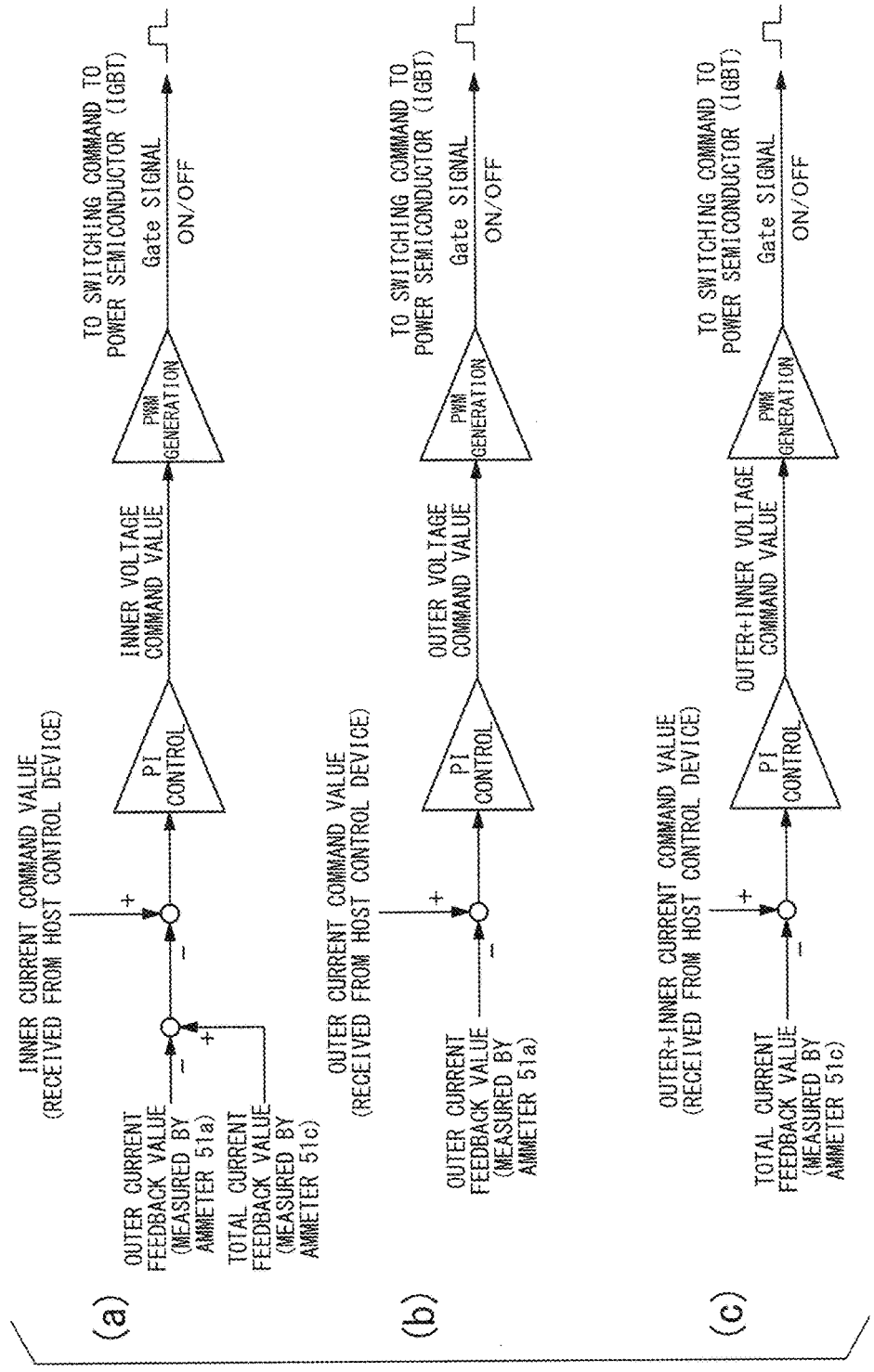
FIG. 15 is a view showing the control logics of a current controller of the modification example of the third embodiment of the invention in each conduction modes.

FIG. 14 is a view showing main parts of a circuit of a double stator switched reluctance motor A according to a modification example of the third embodiment of the invention. FIG. 15 is a view showing the control logics of a current controller of the modification example of the third embodiment of the invention in the conduction modes.

In this modification example, as shown in FIG. 14, a current measuring unit 51 includes an ammeter 51a (first ammeter) that measures a current flowing in the coil 22 of the outer stator 20 in the parallel circuit 50, and an ammeter 51c (second ammeter) that measures an input current of the parallel circuit 50. The ammeter 51c may be provided on an output side of the parallel circuit 50 to measure an output current of the parallel circuit 50.

According to this structure, the outer and inner stators 20 and 30 share one inverter 40, it is possible to perform current control by one ammeter 51a, which is provided on the outer stator 20 side in the parallel circuit 50 of the winding wires having the same phase, and one ammeter 51c that is provided outside the parallel circuit 50.

Further, in this modification example, as shown in FIG. 15, the current controller 52 is adapted to obtain a current, which flows in the coil 32 of the inner stator 30, from a difference between the measurement results of the ammeters 51a and 51c. Specifically, PI control is performed in the case of a first mode of (a) of FIG. 15 so that a deviation between the value of a difference between the value (outer current feedback value) of a current measured by the ammeter 51a and the value (total current feedback value) of a current measured by the ammeter 51c and an inner current command value (target value) received from the host control device (not shown) is eliminated. An outer current feedback value can be directly obtained from the ammeter 51a in the case of a second mode of (b) of FIG. 15, and a total current feedback value can be directly obtained from the ammeter 51c in the case of a third mode of (c) of FIG. 15.

Figure 16:
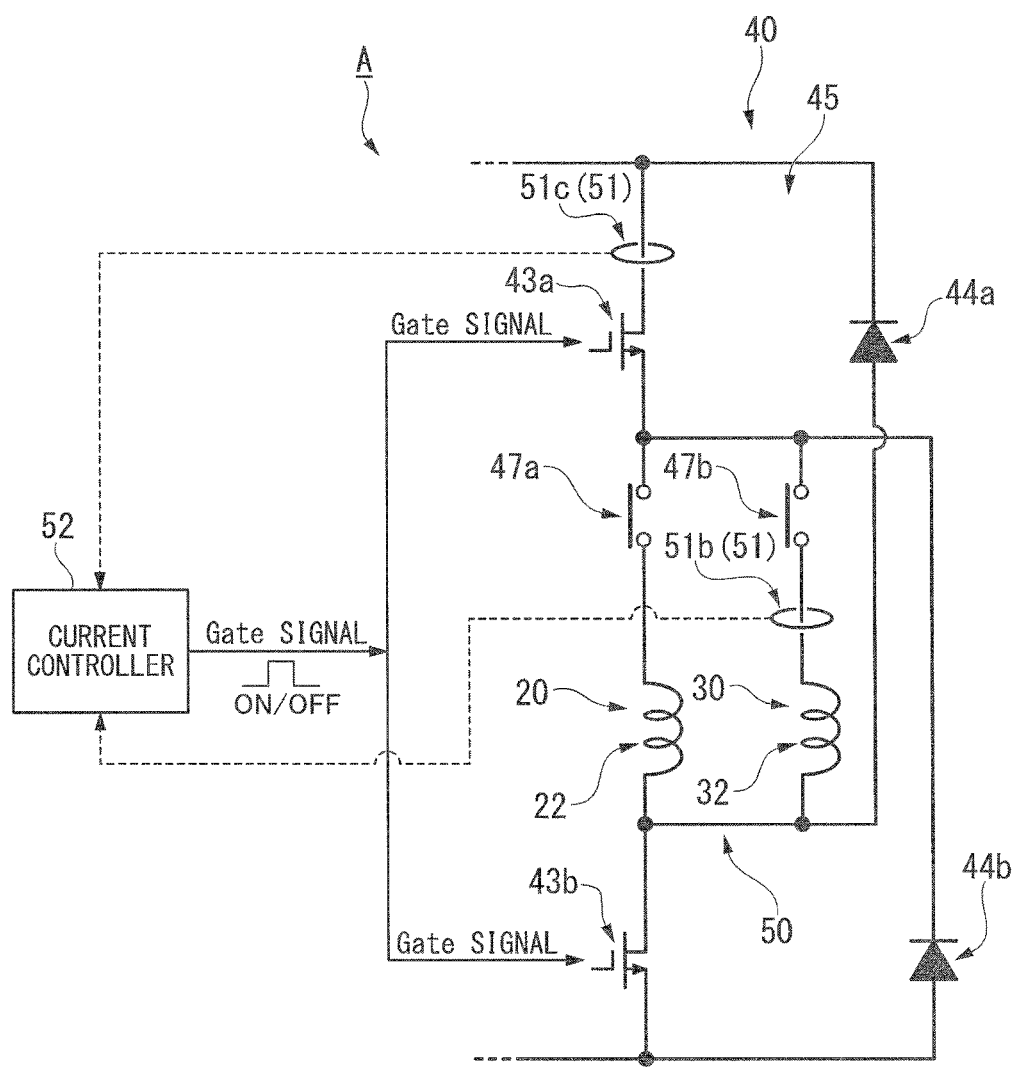
FIG. 16 is a view showing main parts of a circuit of a double stator switched reluctance motor according to another modification example of the third embodiment of the invention.
Figure 17:
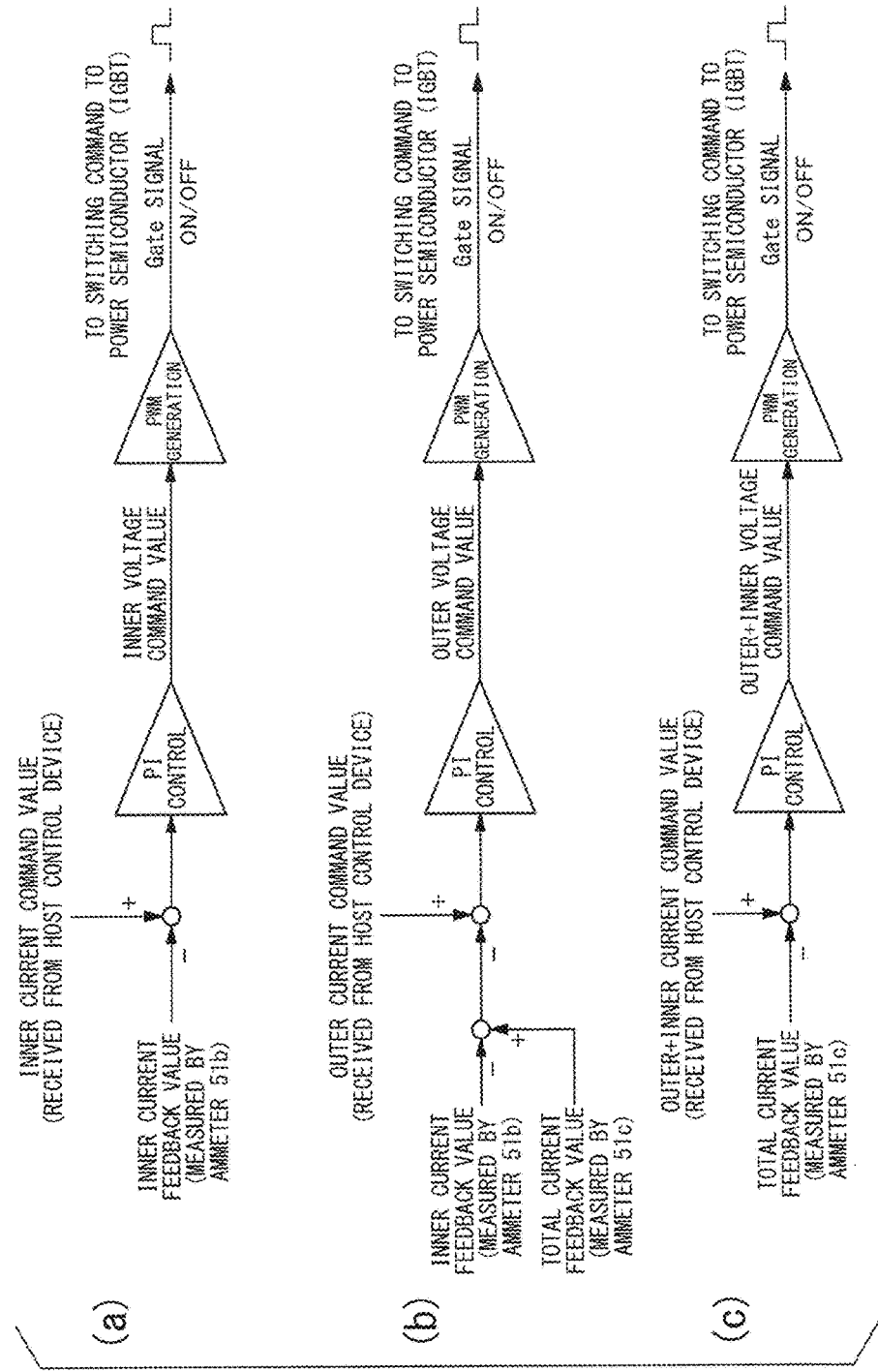
FIG. 17 is a view showing the control logics of a current controller of the modification example of the third embodiment of the invention in each conduction modes.

Furthermore, FIG. 16 is a view showing main parts of a circuit of a double stator switched reluctance motor A according to another modification example of the third embodiment of the invention. FIG. 17 is a view showing the control logics of a current controller of the modification example of the third embodiment of the invention in the conduction modes.

In this modification example, as shown in FIG. 16, a current measuring unit 51 includes an ammeter 51b (first ammeter) that measures a current flowing in the coil 32 of the inner stator 30 in the parallel circuit 50, and an ammeter 51c (second ammeter) that measures an input current of the parallel circuit 50. Meanwhile, the ammeter 51c may be provided on an output side of the parallel circuit 50 to measure an output current of the parallel circuit 50.

Further, in this modification example, as shown in FIG. 17, the current controller 52 is adapted to obtain a current, which flows in the coil 22 of the outer stator 20, from a difference between the measurement results of the ammeters 51b and 51c. Specifically, PI control is performed in the case of a second mode of (b) of FIG. 17 so that a deviation between the value of a difference between the value (inner current feedback value) of a current measured by the ammeter 51b and the value (total current feedback value) of a current measured by the ammeter 51c and an outer current command value (target value) received from the host control device (not shown) is eliminated. An inner current feedback value can be directly obtained from the ammeter 51b in the case of a first mode of (a) of FIG. 17, and a total current feedback value can be directly obtained from the ammeter 51c in the case of a third mode of (c) of FIG. 17.

According to this structure, since the outer and inner stators 20 and 30 share one inverter 40, it is possible to perform current control by one ammeter 51b, which is provided on the inner stator 30 side in the parallel circuit 50, and one ammeter 51c that is provided outside the parallel circuit 50.

Since the accuracy of a current feedback value is high when the current feedback value is directly measured by an ammeter, it is preferable that the structure of the current measuring unit 51 is selected according to the specifications of the switched reluctance motor A. For example, when the motor is operated on low output (when the motor is often operated in the first mode and the second mode), it is preferable that the ammeters are disposed as shown in FIG. 12. Further, when the motor is operated on high output (when the motor is often operated in the second mode and the third mode), it is preferable that the ammeters are disposed as shown in FIG. 14. Furthermore, when an output is extremely changed to a high output and a low output (when the motor is often operated in the first mode and the third mode), it is preferable that the ammeters are disposed as shown in FIG. 16.

Figure 18:
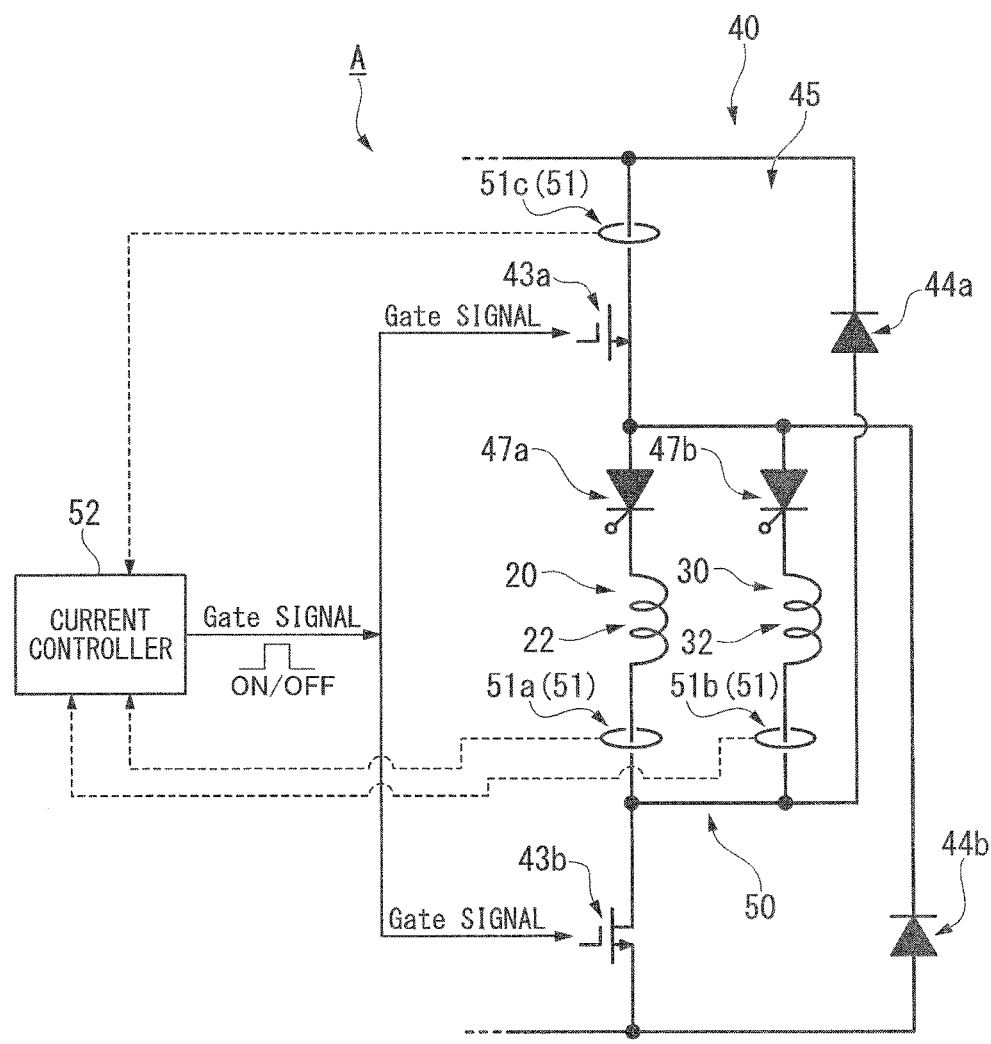
FIG. 18 is a view showing main parts of a circuit of a double stator switched reluctance motor according to another modification example of the third embodiment of the invention.

In addition, a structure shown in FIG. 18 can also be employed in the third embodiment.

In the following description, the same components as the components of the above-mentioned embodiments or components equivalent to the components of the above-mentioned embodiments will be denoted by the same reference numerals and the description thereof will be simplified or omitted.

FIG. 18 is a view showing main parts of a circuit of a double stator switched reluctance motor according to another modification example of the third embodiment of the invention.

In this modification example, as shown in FIG. 18, the switches 47a and 47b for switching a conduction mode are formed of thyristors. Further, a current measuring unit 51 includes an ammeter 51a (first ammeter) that measures a current flowing in the coil 22 of the outer stator 20 in the parallel circuit 50, an ammeter 51b (second ammeter) that measures a current flowing in the coil 32 of the inner stator 30 in the parallel circuit 50, and an ammeter 51c (third ammeter) that measures an input current of the parallel circuit 50. The ammeter 51c may be provided on an output side of the parallel circuit 50 to measure an output current of the parallel circuit 50.

According to this modification example, since the switches 47a and 47b are formed of thyristors, it is possible to easily switch a conduction mode by making a gate current flow in the thyristors. Further, the accuracy of a current feedback value is high when the current feedback value is directly measured by an ammeter. However, since three ammeters 51*a*, 51*b*, and 51*c* are provided in this modification example, it is possible to perform accurate current control in all of the first mode, the second mode, and the third mode.

According to this structure, since the switching elements 47*a*, 47*b* of the input or output side of the invetter (power converter) 40 can be driven as the switches that switch the conduction mode of one or both of the outer and inner stators 20 and 30. Accordingly, it is not necessary to provide switches of which the structures are different from those of the switching elements 47*a*, 47*b* of the power converter 40 and to provide a dedicated drive circuit for driving the switches 47*a*, 47*b*.

(Fourth Embodiment)

Next, a fourth embodiment of the invention will be described. In the following description, the same components as the components of the above-mentioned embodiments or components equivalent to the components of the above-mentioned embodiments will be denoted by the same reference numerals and the description thereof will be simplified or omitted.

Figure 19:
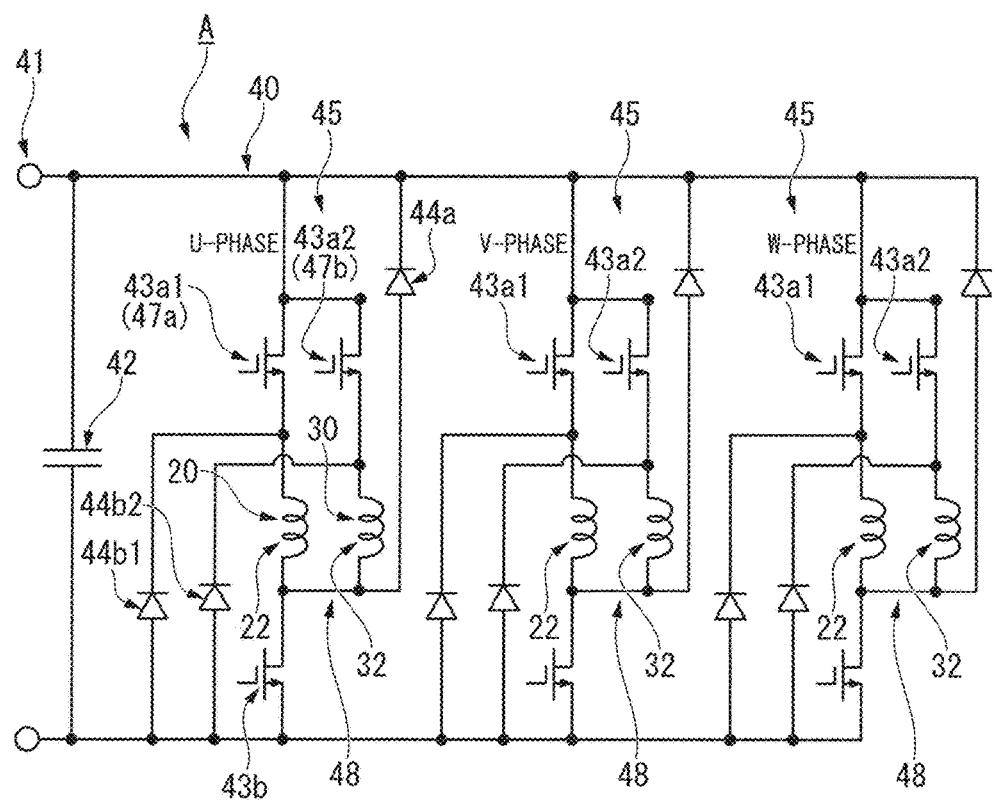
FIG. 19 is a circuit diagram of a double stator switched reluctance motor according to a fourth embodiment of the invention.
Figure 20:
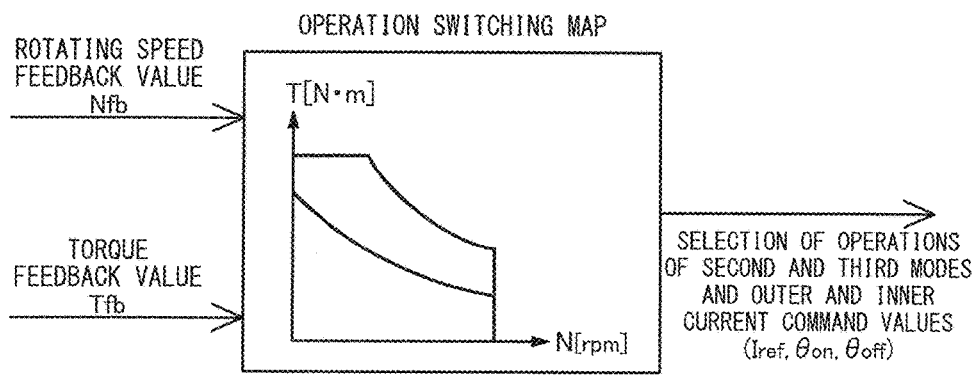
FIG. 20 is a view showing the control logics of the double stator switched reluctance motor according to the fourth embodiment of the invention.
Figure 21:
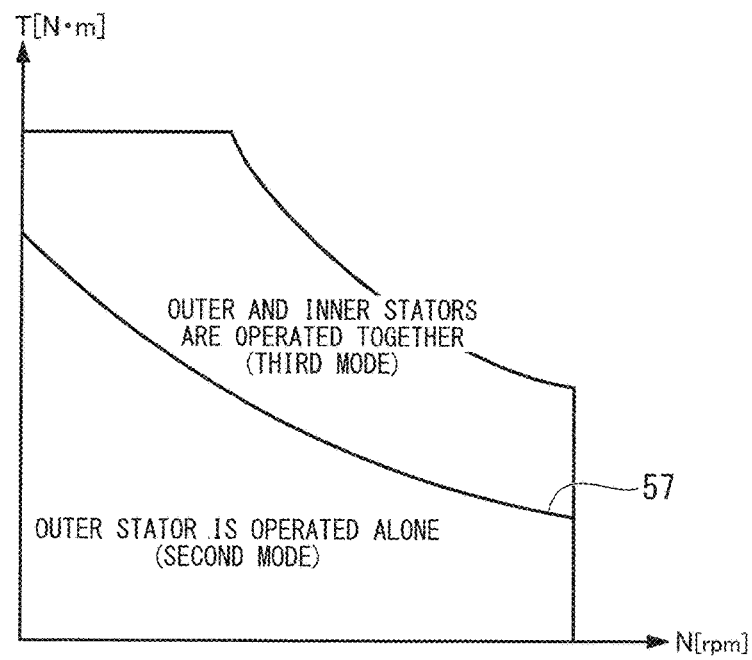
FIG. 21 is a view showing an operation switching map of the double stator switched reluctance motor according to the fourth embodiment of the invention.

FIG. 19 is a circuit diagram of a double stator switched reluctance motor A according to a fourth embodiment of the invention. FIG. 20 is a view showing the control logics of the double stator switched reluctance motor A according to the fourth embodiment of the invention. FIG. 21 is a view showing an operation switching map of the double stator switched reluctance motor A according to the fourth embodiment of the invention.

The fourth embodiment is different from the above-mentioned embodiments in that two switching elements 43*a* (switching elements 43*a*1 and 43*a*2) provided on the above-mentioned input side (high side) of the inverter 40 (power converter) converting DC power into AC power are provided instead of the above-mentioned switches 47*a* and 47*b* as shown in FIG. 19.

The inverter 40 includes parallel circuits 48 that connect coils 22 and 32, which have phases corresponding to each other, of outer and inner stators 20 and 30 in parallel. The switching element 43*a*1 is provided on the side of the parallel circuit 48 corresponding to the coil 22, and the switching element 43*a*2 is provided on the side of the parallel circuit 48 corresponding to the coil 32. Further, the above-mentioned two diodes 44*b* (diodes 44*b*1 and 44*b*2) are also provided so as to correspond to the switching elements 43*a*1 and 43*a*2. The switching elements 43*a*1 and 43*a*2 provided on the input side (high side) of the invertor 40 and the switching element 43*b* provided on the output side (low side) of the inverter 40 have the same structure, and are formed of, for example, power semiconductors such as a well-known insulated gate bipolar transistor (IGBT).

The switching elements 43*a*1 and 43*a*2 of the fourth embodiment are subjected to current control so as to switch a conduction mode to a second mode in which a current flows in only the outer stator 20 and a third mode in which a current flows in both the outer and inner stators 20 and 30. Specifically, in the second mode, the switching element 43*a*1 is operated and the switching element 43*a*2 is always turned "OFF". Both the switching elements 43*a*1 and 43*b*2 are simultaneously operated in the third mode.

In the switching of a conduction mode, as shown in FIG. 20, an operation switching map of which a vertical axis represents torque T and a horizontal axis represents rotating speed N is stored in advance, an operation of the second or third mode is selected from a rotating speed feedback value Nfb and a torque feedback value Tfb of the rotor 10, and the outer and inner current command values Iref and the outer and inner command values θon and θoff (see FIG. 4) are determined.

As shown in FIG. 21, the operation switching map is formed so as to switch a conduction mode to the second mode and the third mode while a line 57 of an output limit (specifications limit), when the outer stator 20 is operated alone in the second mode, is used as a boundary.

According to the fourth embodiment, as shown in FIG. 19, the switching elements 43*a*1 and 43*a*2 provided on the input side of the inverter 40 are driven as switches that switch the conduction mode of one or both of the outer and inner stators 20 and 30. Even though the number of the switching elements 43*a*1 and 43*a*2 of the inverter 40 is increased, the drive circuits for the switching elements 43*a*1 and 43*a*2 have the same structure or can be shared since the switching elements 43*a*1 and 43*a*2 have the same structure. As described above, according to the fourth embodiment, the switches 47*a* and 47*b* having different structures as in the third embodiment (specifically, thyristors or electromagnetic contactors) do not need to be provided, the number of switches installed in one asymmetric half bridge circuit 45 can be reduced by 1, and dedicated circuits for driving the above-mentioned switches 47*a* and 47*b* do not need to be provided.

Further, according to the fourth embodiment, since a conduction mode is switched between the second mode and the third mode by the operation switching map as shown in FIG. 20, it is possible to cope with an operation on high output. Furthermore, a conduction mode is selected according to the rotating speed feedback value Nth and the torque feedback value Tfb of the rotor 10. Moreover, when the above-mentioned table data are used, the outer and inner current command values Iref and the outer and inner command values θon and θoff (see FIG. 4) can be determined by the same variables. Accordingly, it is possible to simplify a control logic for operation.

(Fifth Embodiment)

Next, a fifth embodiment of the invention will be described. In the following description, the same components as the components of the above-mentioned embodiments or components equivalent to the components of the above-mentioned embodiments will be denoted by the same reference numerals and the description thereof will be simplified or omitted.

Figure 22:
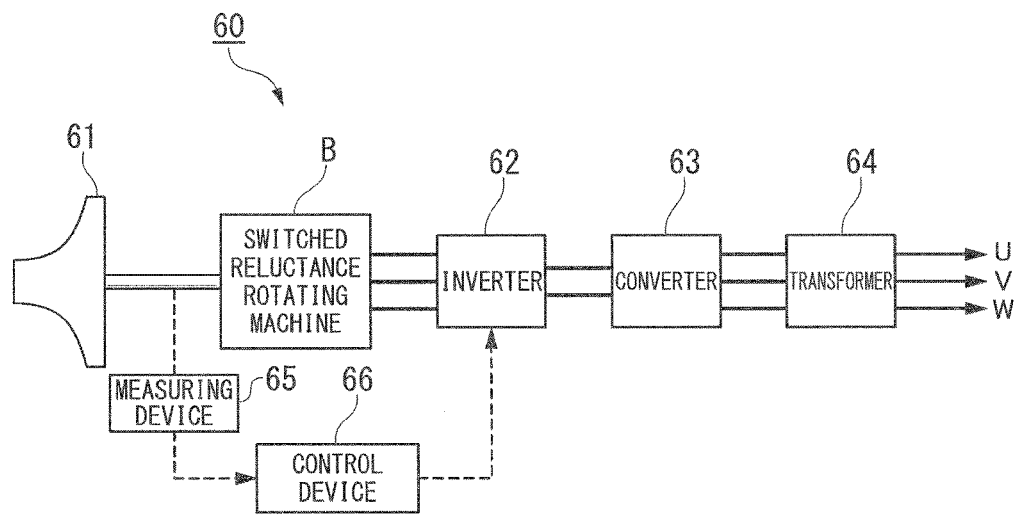
FIG. 22 is a view showing the structure of a rotating machine system according to a fifth embodiment of the invention.

FIG. 22 is a view showing the structure of a rotating machine system 60 according to a fifth embodiment of the invention.

The fifth embodiment is different from the above-mentioned embodiments in that a rotating machine system 60 using the above-mentioned double stator switched reluctance rotating machine as not only a motor but also a generator is provided as shown in FIG. 22. Since the above-mentioned double stator switched reluctance rotating machine is also used as a generator, the above-mentioned double stator switched reluctance rotating machine is simply called a switched reluctance rotating machine B in the following description.

The rotating machine system 60 includes a turbine 61, the switched reluctance rotating machine B as a generator, an inverter 62, a converter 63, a transformer 64, a measuring device 65, and a control device 66.

The turbine 61 converts the kinetic energy of fluid (not shown) into rotational energy. The switched reluctance rotating machine B is adapted so that a rotor 10 (see FIG. 1) is connected to a rotating shaft of the turbine 61. The inverter 62 is a dedicated inverter for the switched reluctance rotating machine B, includes switches 47a and 47b (see FIGS. 10 and 19) as described above, and can switch a conduction mode to some or all of a first mode in which a current flows in only an inner stator 30, a second mode in which a current flows in only an outer stator 20, and a third mode in which a current flows in both the outer and inner stators 20 and 30.

The converter 63 is a usual PWM converter, and converts a DC current, which is taken out of the switched reluctance rotating machine B through the inverter 62, into a sine-wave AC current having a three-phase commercial frequency (50 Hz or 60 Hz). The transformer 64 adjusts a voltage of a three-phase AC current, and outputs the voltage to predetermined power systems, such as factories or homes. The measuring device 65 measures the rotational load of the rotor 10. The measuring device 65 of this embodiment includes a rotating speed sensor that measures the rotating speed of the rotor 10 and a torque sensor that measures the torque of the rotor 10.

The control device 66 switches the conduction mode of the switched reluctance rotating machine B according to the rotational load of the rotor 10. Specifically, the control device 66 switches the conduction mode of the switched reluctance rotating machine B by using, for example, the above-mentioned operation switching map shown in FIG. 20 on the basis of a rotating speed feedback value and a torque feedback value of the rotor 10 that are received from the measuring device 65.

The torque feedback value may be calculated from a power feedback value or the like of the inverter 62 by using a rotating speed feedback value of a rotation sensor without using the torque sensor. When the power feedback value is Pfb [W], the rotating speed feedback value is Ntb [rpm], and the torque feedback value is Tfb [N·m], the torque feedback value Tfb can be expressed by, for example, the following equation (1).

$$Tfb = Pfb/(2\pi(Nfb/60)) \quad (1)$$

According to the fifth embodiment, a conduction mode is automatically switched to a high-efficiency mode according to the rotational load of the rotor 10. Specifically, when the rotational load of the rotor 10 is low (when the turbine 61 rotates at a low speed), the control device 66 switches a conduction mode to the second mode on the basis of the measurement results of the measuring device 65. When the rotational load of the rotor 10 is high (when the turbine 61 rotates at a high speed), the control device 66 switches a conduction mode to the third mode on the basis of the measurement results of the measuring device 65.

Accordingly, according to the fifth embodiment, the rotating machine system 60, which is inexpensive and excellent in reliability and can achieve high-efficiency power generation over a high output from a low output, is obtained.

Further, according to the structure shown in FIG. 22, the turbine 61 and the switched reluctance rotating machine B are directly connected to each other without a gear interposed therebetween. When the rotating speed of the turbine 61 is low, the size of a generator is generally large. Accordingly, since the size of the outer stator 20 can be increased when the switched reluctance rotating machine B is applied as a generator in the case where the rotating speed of the turbine 61 is low, it is possible to secure a large space into which the inner stator 30 is inserted and to obtain a combination structure suitable for the characteristics of the switched reluctance rotating machine B.

Furthermore, structures shown in FIGS. 23 to 28 can also be employed in the fifth embodiment.

In the following description, the same components as the components of the above-mentioned embodiments or components equivalent to the components of the above-mentioned embodiments will be denoted by the same reference numerals and the description thereof will be simplified or omitted.

Figure 23:
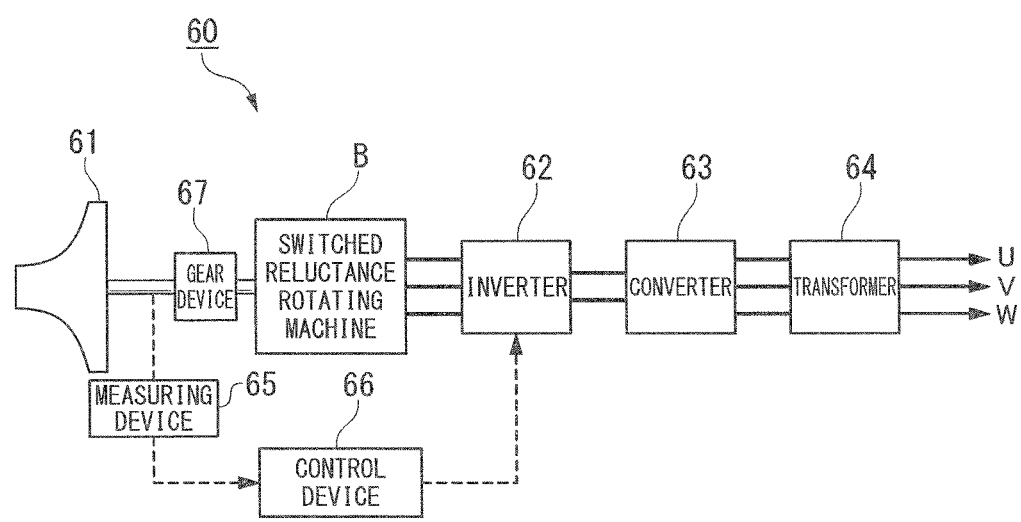
FIG. 23 is a view showing the structure of a rotating machine system according to a modification example of the fifth embodiment of the invention.

FIG. 23 is a view showing the structure of a rotating machine system 60 according to a modification example of the fifth embodiment of the invention.

A gear device 67 is provided in this modification example as shown in FIG. 23. The gear device 67 connects the turbine 61 to the switched reluctance rotating machine B. A gear type mechanical gear, a hydraulic acceleration/deceleration mechanism, or the like can be applied as the gear device 67. According to this structure, even though, for example, the turbine 61 rotates at a low speed, the rotor 10 of the switched reluctance rotating machine B is rotated by the gear device 67 so that the speed of the rotor 10 is increased. Accordingly, high-efficiency power generation can be achieved.

Figure 24:
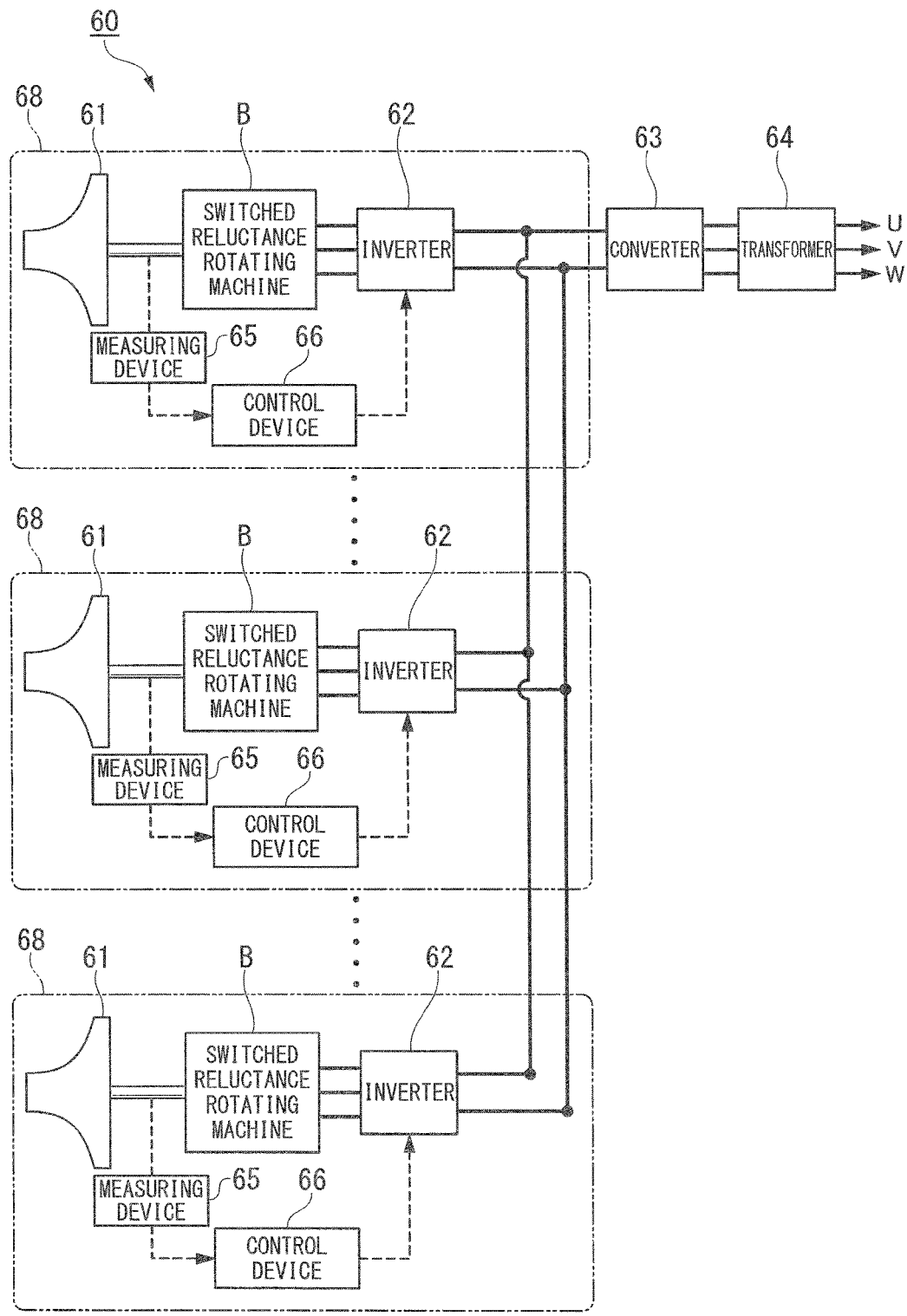
FIG. 24 is a view showing the structure of a rotating machine system according to another modification example of the fifth embodiment of the invention.

FIG. 24 is a view showing the structure of a rotating machine system 60 according to another modification example of the fifth embodiment of the invention.

A plurality of turbine generators 68 are provided in parallel in this modification example as shown in FIG. 24. The turbine generator 68 includes a turbine 61, a switched reluctance rotating machine B, an inverter 62, a measuring device 65, and a control device 66. The switched reluctance rotating machine B and the inverter 62 of the turbine generator 68 are connected to the other turbine generators 68 by direct current. According to this structure, since one large-capacity converter can be used as a converter 63, the number of converters 63 can be reduced. Further, since a power-transmission section of a direct current portion can be lengthened, it is possible to suppress an influence of the limit of transmission capacity caused by an increase of the capacitance of a power transmission cable that becomes undesirable in an alternating-current transmission system.

That is, since the capacitance of a power transmission cable is generally large in an alternating-current transmission system, the scale of a phase modifying facility for the compensation of reactive power, which is caused by the capacitance of the power transmission cable, is increased in order to transmit a large amount of power over a long distance. According to the structure shown in FIG. 24, since the power-transmission section of a direct-current transmission system can be lengthened, it is possible to suppress an increase of costs of facilities and the resonance of a power system in comparison with a simple alternating-current transmission system. Accordingly, the structure shown in FIG. 24 is suitable for power transmission over a long distance.

Figure 25:
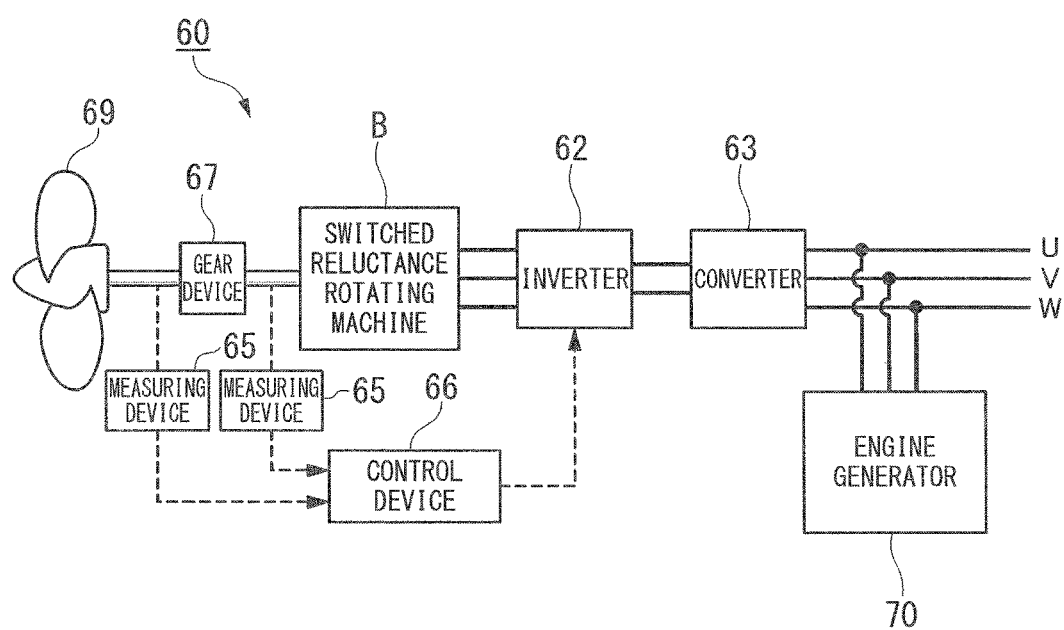
FIG. 25 is a view showing the structure of a rotating machine system according to another modification example of the fifth embodiment of the invention.

FIG. 25 is a view showing the structure of a rotating machine system 60 according to another modification example of the fifth embodiment of the invention.

A propeller 69 for a ship and an engine generator 70 driving the switched reluctance rotating machine B are provided in this modification example as shown in FIG. 25. That is, the switched reluctance rotating machine B functions as a motor for a propeller machine for a ship in this modification example. The propeller 69 is connected to the switched reluctance rotating machine B through a gear device 67. In this modification example, the switched reluctance rotating machine B is driven by power supplied from an engine generator 70, which is separately provided on a ship, and obtains a propulsive force for a ship by rotating the propeller 69 through the gear device 67. Further, in this modification example, a measuring device 65 detects rotational loads from a shaft that connects the propeller 69 to the gear device 67 and a shaft that connects the gear device 67 to the switched reluctance rotating machine B. According to this structure, even when the gear device 67 includes a speed change mechanism, the control device 66 can acquire accurate rotational load information on an input side and an output side of the gear device 67.

Figure 26:
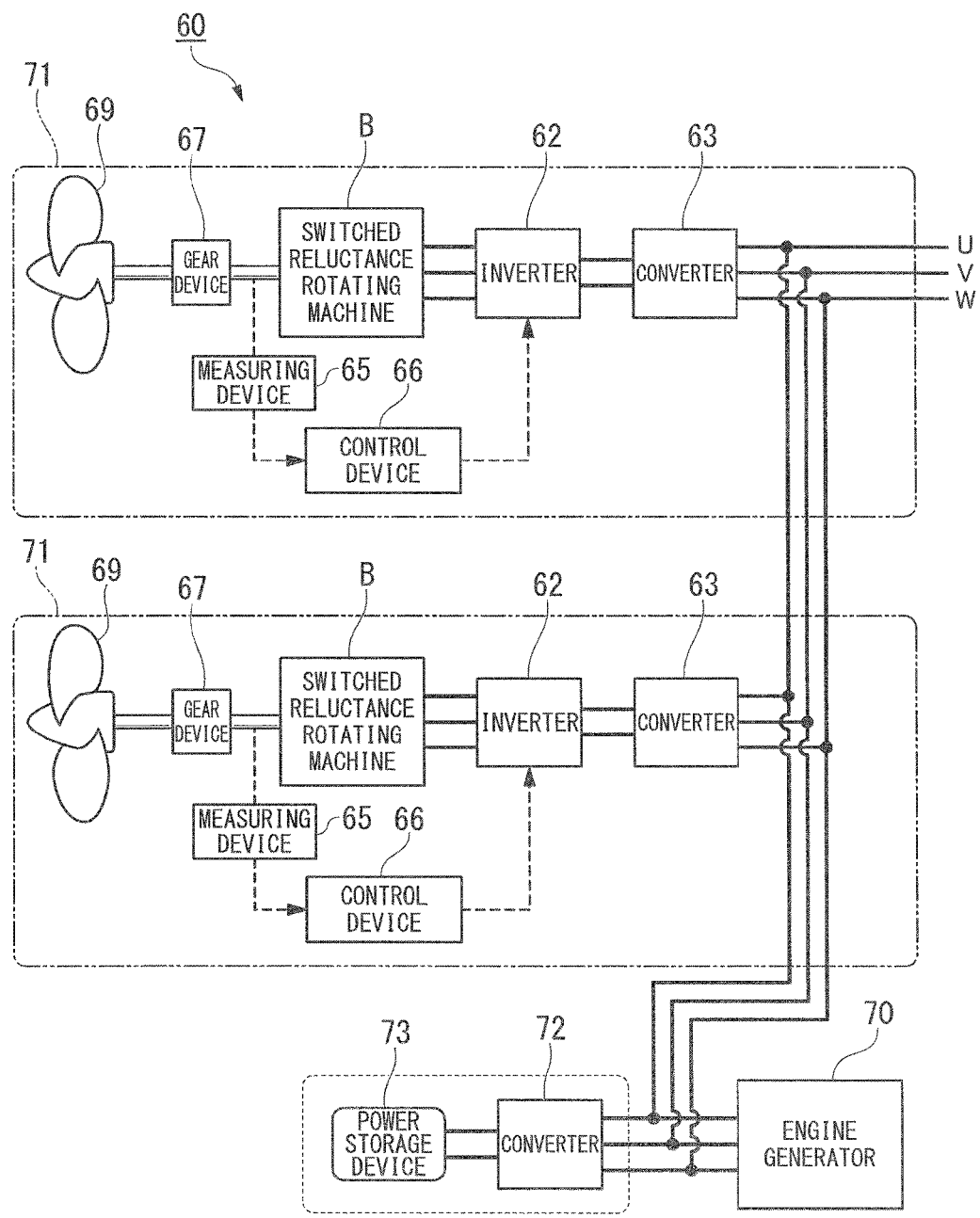
FIG. 26 is a view showing the structure of a rotating machine system according to another modification example of the fifth embodiment of the invention.

FIG. 26 is a view showing the structure of a rotating machine system 60 according to another modification example of the fifth embodiment of the invention.

A plurality of propeller machines 71 are provided in parallel in this modification example as shown in FIG. 26. The propeller machine 71 includes a propeller 69, a gear device 67, a switched reluctance rotating machine B, an inverter 62, a converter 63, a measuring device 65, and a control device 66. The plurality of propeller machines 71 are driven by power supplied from an engine generator 70, and obtain a propulsive force for a ship. Further, a converter 72 and a power storage device 73 are provided in this modification example. That is, in this modification example, the switched reluctance rotating machine B is operated not as a motor but a generator, for example, during the deceleration of the propeller machine 71 according to the operating state, converts the regenerative power thereof into a DC current that can be stored by the converter 72, and can store the DC current in the power storage device 73. A secondary battery, such as a lithium-ion battery, a large-capacity electric double-layer capacitor (EDLC), or the like can be employed as the power storage device 73. According to the structure shown in FIG. 26, when the plurality of propeller machines 71 are provided, the structure shown in FIG. 26 can be suitable for the recovery of regenerative power.

Figure 27:
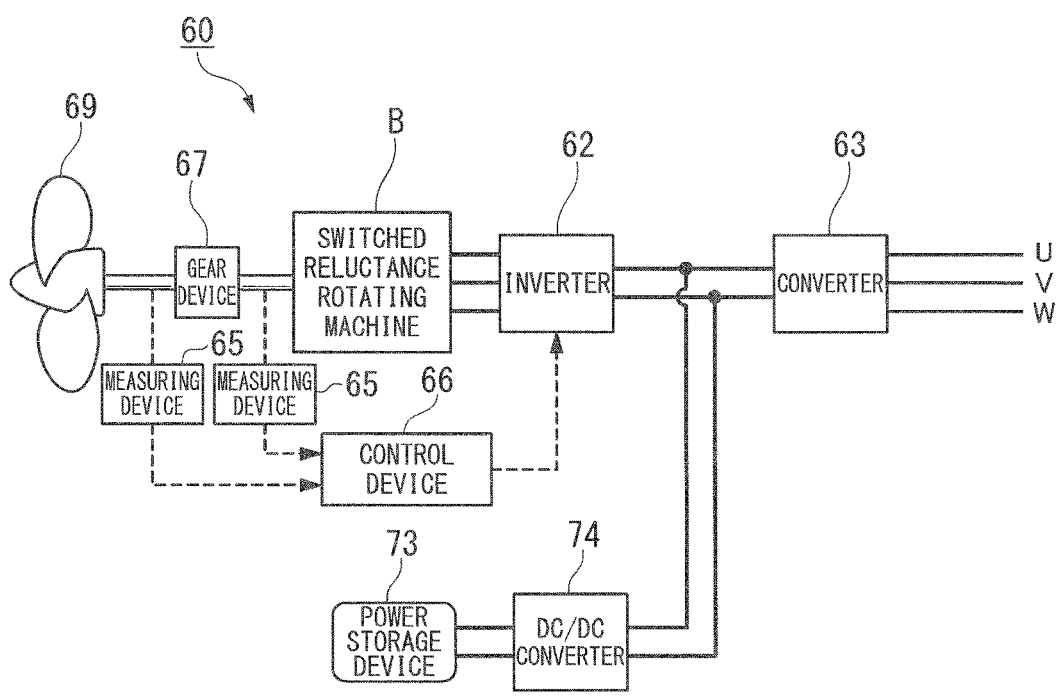
FIG. 27 is a view showing the structure of a rotating machine system according to another modification example of the fifth embodiment of the invention.

FIG. 27 is a view showing the structure of a rotating machine system 60 according to another modification example of the fifth embodiment of the invention.

In this modification example, as shown in FIG. 27, a power storage device 73 is connected to an inverter 62 for a switched reluctance rotating machine B through a DC/DC converter 74 by direct current. According to this structure, it is possible to transform power, which is recovered in the power storage device 73, by the DC/DC converter 74, and to obtain a propulsive force for a ship by driving the switched reluctance rotating machine B through the inverter 62.

Figure 28:
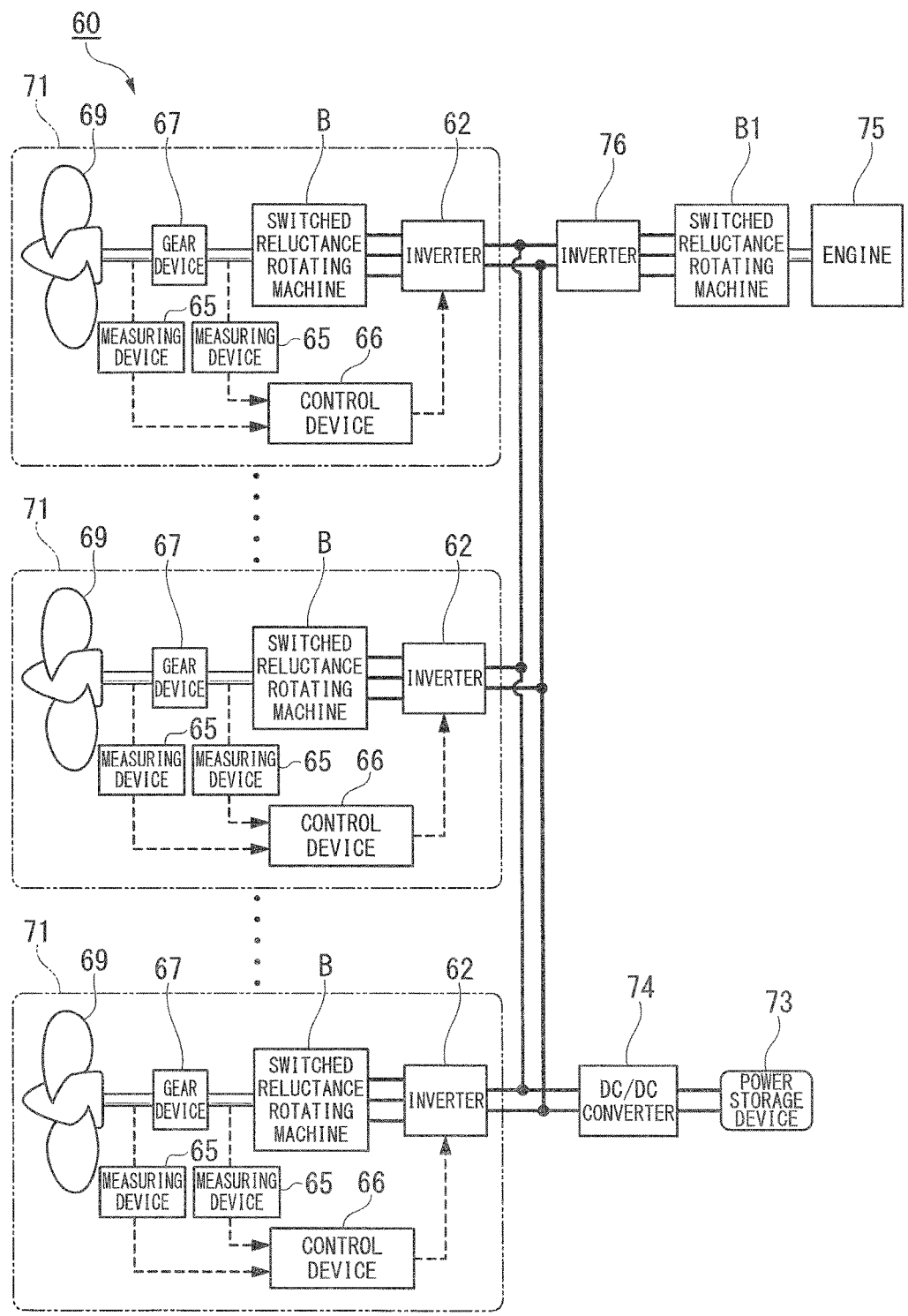
FIG. 28 is a view showing the structure of a rotating machine system according to another modification example of the fifth embodiment of the invention.

FIG. 28 is a view showing the structure of a rotating machine system 60 according to another modification example of the fifth embodiment of the invention.

An engine 75 for a ship, a second switched reluctance rotating machine B1, and an inverter 76 are provided in this modification example as shown in FIG. 28. The second switched reluctance rotating machine B1 is the above-mentioned double stator switched reluctance rotating machine, and functions as an engine generator for the engine 75. The inverter 76 is a dedicated inverter for the second switched reluctance rotating machine B1, includes switches 47*a* and 47*b* (see FIGS. 10 and 19) as described above, and can switch a conduction mode.

Further, a plurality of propeller machines 71 (excluding a converter 63) are provided in this modification example, and are connected to the inverter 76 by direct current. Further, in this modification example, the power storage device 73 is connected to the plurality of propeller machines 71 through DC/DC converter 74 by direct current. Accordingly, when the motor is driven, not only power of the second switched reluctance rotating machine B1 as an engine generator but also power stored in the power storage device 73 can be used to drive the motor. According to the structure shown in FIG. 28, since the second switched reluctance rotating machine B1 functions as an engine generator, the structure of the engine generator is common to that of the switched reluctance rotating machine B of the propeller machine 71. Accordingly, the structure shown in FIG. 28 can be suitable for maintenance.

Preferred embodiments of the invention have been described above with reference to the drawings, but the invention is not limited to the above-mentioned embodiments. The shapes, the combination, and the like of the components described in the above-mentioned embodiments are illustrative, and may be variously modified on the basis of design requirements and the like without departing from the scope of the invention.

For example, a three-phase motor has been exemplified in the above-mentioned embodiments, but the invention is not limited thereto. The invention can also be applied to a two-phase motor, a four-phase motor, a five-phase motor, and the like. Furthermore, the 12/8-pole structure of the three-phase motor has been exemplified. However, the invention is not limited to the number of the poles and may be applied to, for example, a 6/4-pole structure and the like. This is also the same in the case in which the invention is applied to a generator.

For example, a case in which two switching elements provided on the input side of the inverter are provided as switches switching the conduction mode of one or both of the outer and inner stators has been described in the fourth embodiment. However, two switching elements provided on the output side (low side) of the inverter may be provided as the switches. Two diodes, each of which is denoted by reference numeral 44*a* of FIG. 10, are required in this case.

Further, for example, the conduction mode may be switched to the first and second modes, may be switched to the first and third modes, may be switched to the second and third modes described above, and may be switched to all of the first to third modes described above.

Furthermore, the turbine generator has been exemplified as the rotating machine system in the fifth embodiment. However, a structure in which a windmill instead of the turbine is connected so that the rotating machine system functions as a wind generator and structures of other generators may be employed.

Moreover, for example, a structure in which the rotational load of the rotor is directly measured by the rotating speed sensor and the torque sensor has been described in the fifth embodiment. However, for example, the rotational load of the rotor may be indirectly measured from the amount of power generated by the switched reluctance rotating machine, and a wind gauge may be provided in the case of a wind generator to indirectly measure the rotational load of the rotor from the speed of wind.

Further, for example, the structures of the first to fifth embodiments can also be appropriately combined or substituted in the invention.

INDUSTRIAL APPLICABILITY

The invention can be used for a double stator switched reluctance rotating machine.

What is claimed is:
1. A double stator switched reluctance rotating machine comprising:
an annular rotor;
an outer stator that is disposed outside the rotor; and
an inner stator that is disposed inside the rotor, wherein the outer and inner stators are connected to each other in parallel, and a magnetomotive force of the inner stator is smaller than a magnetomotive force of the outer stator.

2. The double stator switched reluctance rotating machine according to claim 1,
wherein the number of phases of the outer stator is the same as the number of phases of the inner stator, and coils, which have phases corresponding to each other, are connected to each other in parallel.

3. The double stator switched reluctance rotating machine according to claim 1, further comprising:
conduction modes that include some or all of a first mode in which a current flows in only the inner stator, a second mode in which a current flows in only the outer stator, and a third mode in which a current flows in both the outer and inner stators, and a switch that switches the conduction modes.

4. The double stator switched reluctance rotating machine according to claim 3, further comprising:
current measuring member configured to measure currents flowing in winding wires, which have phases corresponding to each other, of the outer and inner stators; and
current control member configured to perform current control corresponding to each of the conduction modes on the basis of measurement results of the current measuring member.

5. The double stator switched reluctance rotating machine according to claim 4, further comprising:
an inverter that includes a parallel circuit connecting the winding wires, which have phases corresponding to each other, of the outer and inner stators in parallel,
wherein the current measuring member includes a first ammeter that measures a current flowing in the winding wire of the outer stator in the parallel circuit, and a second ammeter that measures a current flowing in the winding wire of the inner stator in the parallel circuit.

6. The double stator switched reluctance rotating machine according to claim 4, further comprising:
an inverter that includes a parallel circuit connecting the winding wires, which have phases corresponding to each other, of the outer and inner stators in parallel,
wherein the current measuring member includes a first ammeter that measures a current flowing in the winding wire of the outer stator in the parallel circuit, and a second ammeter that measures an input current or an output current of the parallel circuit, and
the current control member obtains a current, which flows in the winding wire of the inner stator, from a difference between measurement results of the first and second ammeters.

7. The double stator switched reluctance rotating machine according to claim 4, further comprising:
an inverter that includes a parallel circuit connecting the winding wires, which have phases corresponding to each other, of the outer and inner stators in parallel,
wherein the current measuring member includes a first ammeter that measures a current flowing in the winding wire of the inner stator in the parallel circuit, and a second ammeter that measures an input current or an output current of the parallel circuit, and
the current control member obtains a current, which flows in the winding wire of the outer stator, from a difference between measurement results of the first and second ammeters.

8. The double stator switched reluctance rotating machine according to claim 3, further comprising:
a power converter including
a parallel circuit that connects the winding wires, which have phases corresponding to each other, of the outer and inner stators in parallel, and
switching elements that are provided on input and output sides of the winding wires and are driven so as to convert power,
wherein the power converter includes the switching elements of the input or output side on the winding wires of the outer and inner stators of the parallel circuit as the switches.

9. The double stator switched reluctance rotating machine according to claim 3, further comprising:
a control device that switches the conduction mode according to a rotational load of the rotor.

10. The double stator switched reluctance rotating machine according to claim 1,
wherein a yoke portion of the rotor has a thickness corresponding to magnetic characteristics of the outer and inner stators.

* * * * *